US012138929B2

(12) United States Patent
Aoki et al.

(10) Patent No.: US 12,138,929 B2
(45) Date of Patent: Nov. 12, 2024

(54) RECORDING APPARATUS

(71) Applicant: SEIKO EPSON CORPORATION, Tokyo (JP)

(72) Inventors: Takeshi Aoki, Matsumoto (JP); Yusaku Amano, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/955,850

(22) Filed: Sep. 29, 2022

(65) Prior Publication Data

US 2023/0035955 A1 Feb. 2, 2023

Related U.S. Application Data

(62) Division of application No. 17/164,223, filed on Feb. 1, 2021, now Pat. No. 11,485,140.

(30) Foreign Application Priority Data

Jan. 31, 2020 (JP) ................................ 2020-014900

(51) Int. Cl.
*B41J 2/165* (2006.01)

(52) U.S. Cl.
CPC ....... *B41J 2/16505* (2013.01); *B41J 2/16517* (2013.01)

(58) Field of Classification Search
CPC ................ B41J 2/16505; B41J 2/16517; B41J 2/16508; B41J 2/16511
See application file for complete search history.

(56) References Cited

U.S. PATENT DOCUMENTS

| | | | |
|---|---|---|---|
| 6,502,922 B2 | 1/2003 | Kawase et al. |
| 6,540,420 B2 | 4/2003 | Fujioka et al. |
| 7,735,958 B2 | 6/2010 | Murayama |
| 8,398,193 B2 | 3/2013 | Izawa et al. |
| 8,585,176 B2 | 11/2013 | Iwasa et al. |
| 10,369,798 B2 | 8/2019 | Mori |

(Continued)

FOREIGN PATENT DOCUMENTS

| | | |
|---|---|---|
| JP | H07246714 A | 9/1995 |
| JP | 2004160801 A | 6/2004 |

(Continued)

OTHER PUBLICATIONS

Office Action for JP Patent Application No. JP2020014812 issued on Oct. 31, 2023, 10 pages of Office Action.

(Continued)

*Primary Examiner* — Sharon Polk
(74) *Attorney, Agent, or Firm* — CHIP LAW GROUP

(57) ABSTRACT

A recording apparatus includes a support portion to transport a medium in a transport direction. A recording head includes an ejecting surface that faces the support portion and is provided with a nozzle to eject liquid to the medium to be transported. A cap portion covers the ejecting surface, and a movement mechanism moves the recording head in a moving direction which is orthogonal to the transport direction. A cap moving portion supports and moves the cap portion between a cap position where a cap surface of the cap portion covers the ejecting surface and a standby position where the cap surface does not cover the ejecting surface.

20 Claims, 17 Drawing Sheets

(56) References Cited

U.S. PATENT DOCUMENTS

| | | | |
|---|---|---|---|
| 10,406,838 B2 | 9/2019 | Ohashi et al. | |
| 10,792,913 B2 | 10/2020 | Kohnotoh | |
| 10,864,747 B2 | 12/2020 | Nakagawa et al. | |
| 10,974,527 B2 | 4/2021 | Ohashi et al. | |
| 11,052,663 B2 | 7/2021 | Muromachi et al. | |
| 11,458,733 B2 | 10/2022 | Shimomura et al. | |
| 2001/0038401 A1 | 11/2001 | Kawase et al. | |
| 2008/0012896 A1 | 1/2008 | Murayama | |
| 2012/0019577 A1 | 1/2012 | Izawa et al. | |
| 2012/0113180 A1 | 5/2012 | Tanaka et al. | |
| 2014/0078231 A1 | 3/2014 | Ito et al. | |
| 2018/0236797 A1 | 8/2018 | Ohashi et al. | |
| 2019/0111703 A1 | 4/2019 | Nakagawa et al. | |
| 2019/0299596 A1 | 10/2019 | Kohnotoh | |
| 2020/0016911 A1 | 1/2020 | Ohashi et al. | |
| 2020/0122470 A1 | 4/2020 | Muromachi et al. | |
| 2021/0237447 A1 | 8/2021 | Shimomura et al. | |
| 2021/0237452 A1* | 8/2021 | Shimomura | B41J 2/1433 |
| 2022/0402270 A1 | 12/2022 | Shimomura et al. | |

FOREIGN PATENT DOCUMENTS

| | | |
|---|---|---|
| JP | 2006159528 A | 6/2006 |
| JP | 2006219235 A | 8/2006 |
| JP | 2007130808 A | 5/2007 |
| JP | 2007130809 A | 5/2007 |
| JP | 2008168528 A | 7/2008 |
| JP | 2010214780 A | 9/2010 |
| JP | 2011073154 B | 6/2013 |
| JP | 2010214780 B | 12/2013 |
| JP | 2012025054 B | 4/2014 |
| JP | 6156563 B1 | 7/2017 |
| JP | 2019018360 A | 2/2019 |
| JP | 2019073011 A | 5/2019 |
| JP | 2019166762 A | 10/2019 |
| JP | 6608470 B2 | 11/2019 |
| JP | 2020011522 A | 1/2020 |
| JP | 2020062816 A | 4/2020 |
| JP | 2021121478 A | 8/2021 |
| JP | 2019171794 B | 8/2022 |

OTHER PUBLICATIONS

Office Action for JP Patent Application No. JP2020014900 issued on Oct. 31, 2023, 6 pages of Office Action.

Office Action for JP Patent Application No. JP2020014812, issued on Dec. 19, 2023, 12 pages of Office Action.

Office Action for U.S. Appl. No. 17/821,625, issued on Mar. 8, 2024.

Office Action for JP Patent Application No. JP2020014812, issued on Feb. 27, 2024, 6 pages of Office Action.

Office Action for JP Patent Application No. JP2020198136, issued on Jul. 2, 2024, 8 pages of Office Action.

Office Action for JP Patent Application No. JP2023205128, issued on Sep. 3, 2024, 10 pages.

* cited by examiner

RECORDING APPARATUS

This application is a divisional application of U.S. patent application Ser. No. 17/164,223, filed on Feb. 2, 2021, which claims priority from JP Application Serial Number 2020-014900, filed Jan. 31, 2020. Each of the above-referenced applications is hereby incorporated herein by reference in its entirety.

BACKGROUND

1. Technical Field

The present disclosure relates to a recording apparatus.

2. Related Art

A printer head apparatus of JP-A-2019-18360 has a printer head body, a wiper that cleans the printer head body, and a cap that is mounted on the printer head body. The wiper moves along a long-side direction of the printer head body. The cap moves along a short-side direction of the printer head body.

In the printer head apparatus described in JP-A-2019-18360, since the wiper and the cap are positioned so as not to overlap in the movement direction of the printer head body as a recording head, there is a concern that the recording apparatus may increase in size in the movement direction of the recording head.

SUMMARY

According to an aspect of the present disclosure, a recording apparatus includes a recording head that records on a medium by ejecting liquid from an ejecting portion; a support portion that is disposed so as to face the recording head and that supports the medium; a movement mechanism that moves the recording head along a movement direction in which the recording head moves back and forth with respect to the support portion, to a recording position where recording on the medium is configured to be performed and a retracted position farther away from the support portion than is the recording position; a cap portion that is configured to move back and forth between the recording head and the support portion in a first direction that intersects the movement direction, and that covers the ejecting portion when the recording head is located at the retracted position; and a cleaning portion that is configured to move back and forth between the recording head and the support portion in a second direction that intersects both the movement direction and the first direction and that cleans the ejecting portion when the recording head is located at the retracted position, in which at least a portion of a first movement area where the cap portion moves and at least a portion of a second movement area where the cleaning portion moves are disposed at an identical position in the movement direction.

DESCRIPTION OF EXEMPLARY EMBODIMENTS

Figure 1:
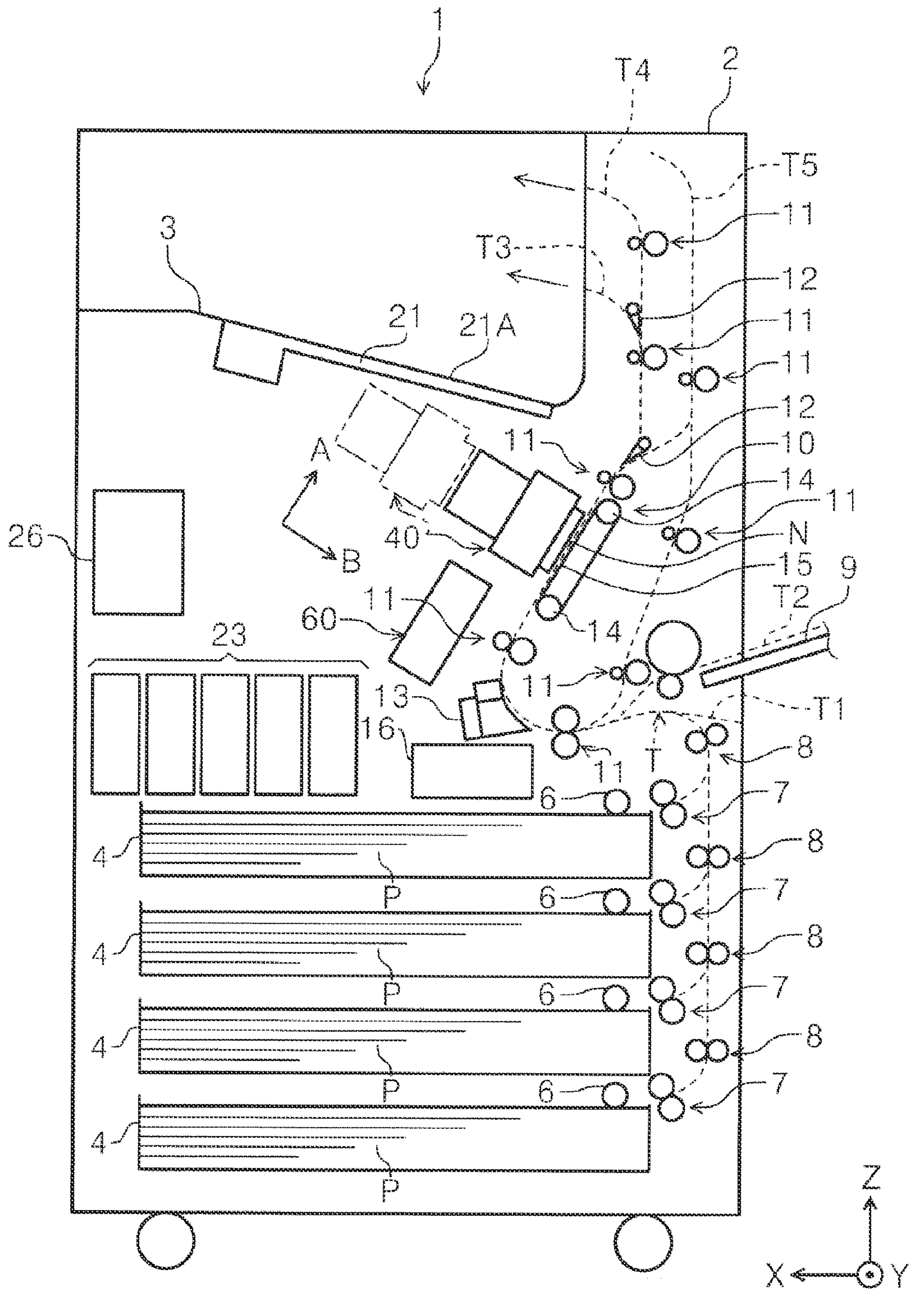
FIG. 1 is a diagram illustrating a transport path of a medium in a printer according to an embodiment.

Hereinafter, the present disclosure will be schematically described.

According to a first aspect of the present disclosure, a recording apparatus includes a recording head that records on a medium by ejecting liquid from an ejecting portion; a support portion that is disposed so as to face the recording head and that supports the medium; a movement mechanism that moves the recording head along a movement direction in which the recording head moves back and forth with respect to the support portion, to a recording position where recording on the medium is configured to be performed and a retracted position farther away from the support portion than is the recording position; a cap portion that is configured to move back and forth between the recording head and the support portion in a first direction that intersects the movement direction, and that covers the ejecting portion when the recording head is located at the retracted position; and a cleaning portion that is configured to move back and forth between the recording head and the support portion in a second direction that intersects both the movement direction and the first direction and that cleans the ejecting portion when the recording head is located at the retracted position, in which at least a portion of a first movement area where the cap portion moves and at least a portion of a second movement area where the cleaning portion moves are disposed at an identical position in the movement direction.

According to this aspect, at least a portion of the first movement area in which the cap portion moves and at least a portion of the second movement area in which the cleaning portion moves are disposed at the identical position in the movement direction. As a result, since the area required for moving the cap portion and the cleaning portion becomes small compared with a configuration in which the first movement area and the second movement area are disposed so as to be offset in the movement direction, it is possible to suppress the recording apparatus from increasing in size in the movement direction of the recording head.

In a second aspect according to the first aspect, the recording apparatus further includes a set of side walls that face in the second direction, in which the recording head moves in the movement direction between one of the side walls and another of the side walls, and the second movement area penetrates the one of the side walls in the second direction.

According to this aspect, the recording head moves between the one side wall and the other side wall. Here, because the second movement area penetrates the one side wall in the second direction, the cleaning portion can be retracted to the outside of the one side wall, thus it is possible to suppress the movement area of the recording head from being narrowed by the cleaning portion.

In the recording apparatus of a third aspect according to the second aspect, the set of side walls are respectively provided with guide members that guide the recording head in the movement direction, and one of the guide members is divided in the movement direction by the second movement area.

According to this aspect, since the second movement area is located at a position that divides one of the guide members, it is possible to dispose the guide members that guide the recording head and the cleaning portion near each other, thus it is possible to reduce the size of the recording apparatus.

In the recording apparatus of a fourth aspect according to the third aspect, the recording head is provided with protruding portions that protrude in the second direction, and the guide members have longitudinal groove portions that are open toward the recording head and that guide the protruding portions in the movement direction.

According to this aspect, because the longitudinal groove portions surround the protruding portions except at opening portions, when the movement mechanism moves the recording head in the movement direction, it is possible to suppress the position of the recording head from shifting in the first direction and the second direction.

In the recording apparatus of a fifth aspect according to the fourth aspect, the protruding portions have a plurality of rotary members two or more of which are disposed on one side and two or more of which are disposed on another side in the second direction and which are rotated through contact with the longitudinal groove portions, and when one of the rotary members is located in the second movement area, the others of the rotary members are guided by the longitudinal groove portions.

According to this aspect, when the one of the rotary members is located in the space of the second movement area, the other of the rotary members are guided by the longitudinal groove portions. As a result, regardless of the position of the second movement area, because the state in which the recording head is supported is maintained, it is possible to suppress the orientation of the recording head from changing during movement.

In the recording apparatus of a sixth aspect according to the fourth or fifth aspect, a widened portion widened in the first direction is formed in a portion of one of the longitudinal groove portions corresponding to the one of the guide members divided by the second movement area.

According to this aspect, during the movement of the recording head, at least one of three or more rotary members is located in the widened portion. As a result, because all of the rotary members are suppressed from being simultaneously located at the narrowest position of the longitudinal groove portion, and the load on the longitudinal groove portion from the rotary members is reduced, it is possible to suppress a portion of the longitudinal groove portion from being scraped off by the movement of the rotary members.

In the recording apparatus of a seventh aspect according to any one of the fourth to sixth aspects, the one of the side walls and the other of the side walls are provided with lateral groove portions that intersect the longitudinal groove portions and guide the cap portion in the first direction.

According to this aspect, because the longitudinal groove portions and the lateral groove portions intersect, it is possible to dispose the recording head and the cap portion near each other, thus the recording apparatus can be reduced in size.

In the recording apparatus of an eighth aspect according to the seventh aspect, the depths of the longitudinal groove portions are larger than the depths of the lateral groove portions, and the longitudinal groove portions are continuous in the movement direction at intersection portions where the longitudinal groove portions and the lateral groove portions intersect.

According to this aspect, because the depths of the longitudinal groove portions are larger than the depths of the lateral groove portions, the longitudinal groove portions are continuously disposed in the movement direction at the intersection portion, thus it is possible to suppress the rotary members from coming off the longitudinal groove portions.

In the recording apparatus of a ninth aspect according to the eighth aspect, the cap portion is provided with a plurality of lateral protruding portions two or more of which protrude from one side and two or more of which protrude from another side in the second direction and that are guided by the lateral groove portions, and, when one of the lateral protruding portions is located at corresponding one of the intersection portions, the others of the lateral protruding portions are guided by the lateral groove portions.

According to this aspect, when one of the lateral protruding portions is located in the space of the intersection portion, the other of the lateral protruding portions are guided by the lateral groove portions. As a result, regardless of the position of the intersection portion, because the state in which the cap portion is supported is maintained, it is possible to suppress the orientation of the cap portion from changing during movement.

In the recording apparatus of a tenth aspect according to any one of the seventh to ninth aspects, the lateral groove portions are disposed adjacent to the second movement area in the movement direction.

According to this aspect, because the lateral groove portions are disposed adjacent to the second movement area in the movement direction, it is possible to dispose the cap portion near the recording head, thus the recording apparatus can be reduced in size in the movement direction.

In the recording apparatus of an eleventh aspect according to any one of the first to tenth aspects, the movement mechanism moves the recording head so that the movement direction intersects both a vertical direction and a horizontal direction.

According to this aspect, the movement mechanism moves the recording head in the movement direction that intersects both the vertical direction and the horizontal direction. Gravity acting on the recording head in the vertical direction is decomposed into a component force along the movement direction and a component force along a direction perpendicular to the movement direction. Here, because the component force acting on the recording head in the movement direction becomes smaller than gravity acting on the recording head in the vertical direction, the force required to move the recording head becomes smaller, thus, compared with a configuration in which the recording head is moved in the vertical direction, it is possible to suppress an increase in the load acting on the movement mechanism.

Hereinafter, a printer 1 of the embodiment as an example of a recording apparatus according to the present disclosure will be specifically described.

FIG. 1 illustrates the printer 1 as an example of a recording apparatus. The printer 1 is configured as an ink jet apparatus that records by ejecting ink, which is an example of a liquid, onto a medium P represented by recording paper. Further, the XYZ coordinate system represented in each figure is a Cartesian coordinate system.

The Y direction is a width direction of the medium P and an apparatus depth direction that intersect with the transport direction of the medium P, and is, for example, a horizontal direction. In addition, the Y direction is an example of an apparatus depth direction that intersects both an A direction and a B direction, which will be described later. The direction toward the front in the Y direction is referred to as the +Y direction, and the direction toward the rear is referred to as the −Y direction. Furthermore, the Y direction is an example of a second direction.

The X direction is an apparatus width direction, and, for example, is a horizontal direction. The direction to the left in the X direction when viewed from an operator of the printer 1 is referred to as the +X direction, and the direction to the right is referred to as the −X direction.

The Z direction is an apparatus height direction, and is, for example, a vertical direction. The upward direction in the Z direction is referred to as the +Z direction, and the downward direction is referred to as the −Z direction.

In the printer 1, the medium P is transported through a transport path T represented by a broken line.

The AB coordinate system illustrated on the XZ plane is a Cartesian coordinate system.

The A direction is a transport direction of the medium P in an area of the transport path T, the area facing a line head 40 described later. The direction upstream in the A direction is referred to as the −A direction, and the direction downstream is referred to as the +A direction. In addition, the A direction is an example of a first direction. In the present embodiment, the A direction is a direction inclined so that the +A direction is located more toward the +Z direction than is the −A direction. Specifically, it is tilted in the range of 50° to 70° with respect to the horizontal direction, and more specifically, it is tilted approximately 60°.

The B direction is an example of a movement direction, and the movement direction is a direction in which the line head 40 described later moves back and forth with respect to a transport unit 10 described later. The direction in which the line head 40 approaches the transport path T in the B direction is referred to as the +B direction, and the direction away from the transport path T is referred to as the −B direction. In the present embodiment, the B direction is a direction inclined so that the −B direction is located more toward the +Z direction than is the +B direction, and is perpendicular to the A direction.

The printer 1 has a casing 2 as an example of an apparatus body. A discharge portion 3 that forms a space into which the medium P on which information has been recorded is discharged is formed on the +Z direction side of a Z direction center of the casing 2. In addition, a plurality of media cassettes 4 are provided in the casing 2.

Media P are housed in the plurality of media cassettes 4. Each medium P housed in the media cassettes 4 is transported along the transport path T by a pick roller 6 and transport roller pairs 7 and 8. A transport path T1 in which the medium P is transported from an external apparatus and a transport path T2 in which the medium P is transported from a manual feed tray 9 provided in the casing 2 join the transport path T.

In addition, the transport unit 10 described later, a plurality of transport roller pairs 11 that transport the medium P, a plurality of flaps 12 that switch the path along which the medium P is transported, and a medium width sensor 13 that detects the width of the medium P in the Y direction are disposed in the transport path T.

The transport path T is curved at an area facing the medium width sensor 13, and extends diagonally upward from the medium width sensor 13, that is, in the +A direction. A transport path T3 and a transport path T4 that extend toward the discharge portion 3 and an inversion path T5 that reverses the medium P are provided downstream of the transport unit 10 in the transport path T. A discharge tray (not illustrated) is provided in the discharge portion 3 in accordance with the transport path T4.

A discharge tray 21 is provided at a bottom portion of the discharge portion 3. The discharge tray 21 has a placement surface 21A on which the medium P discharged from the transport path T3 is placed.

In addition, in the casing 2, ink housing portions 23 that house ink, a waste liquid storing portion 16 that stores waste liquid of the ink, and a control portion 26 that controls the operation of each portion of the printer 1 are provided. The ink housing portions 23 supply ink to the line head 40 via tubes (not illustrated). The waste liquid storing portion 16 stores ink as waste liquid that has been discharged from the line head 40 toward a flushing portion 66 (refer to FIG. 2) for the purpose of maintenance.

The control portion 26 is configured to include a central processing unit (CPU), a read only memory (ROM), a random access memory (RAM), and a storage (not illustrated), and controls the transport of the medium P in the printer 1, the operation of recording information on the medium P by the line head 40, and the like.

Figure 2:
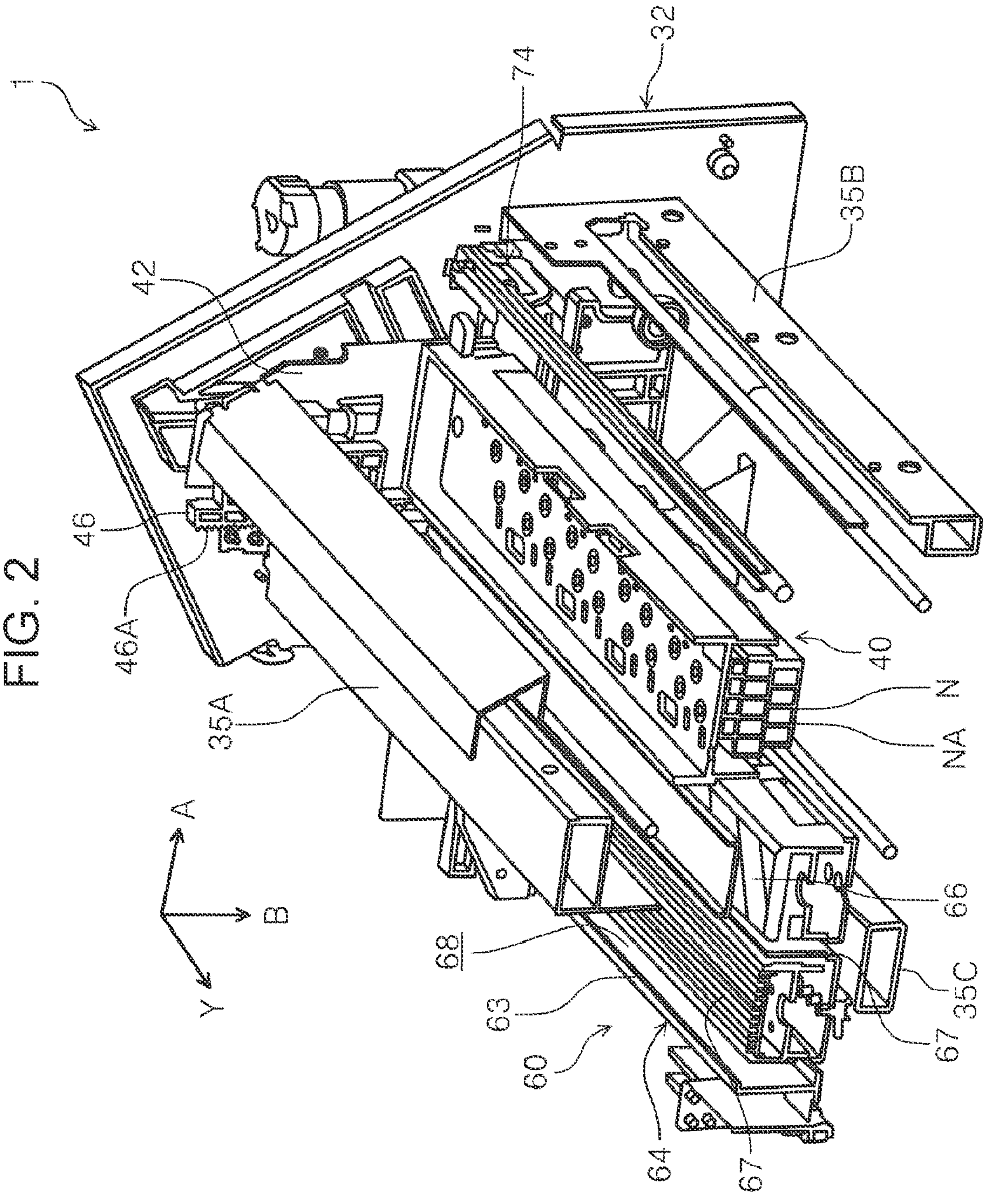
FIG. 2 is a perspective view illustrating a structure around a line head of the printer according to the embodiment.
Figure 4:
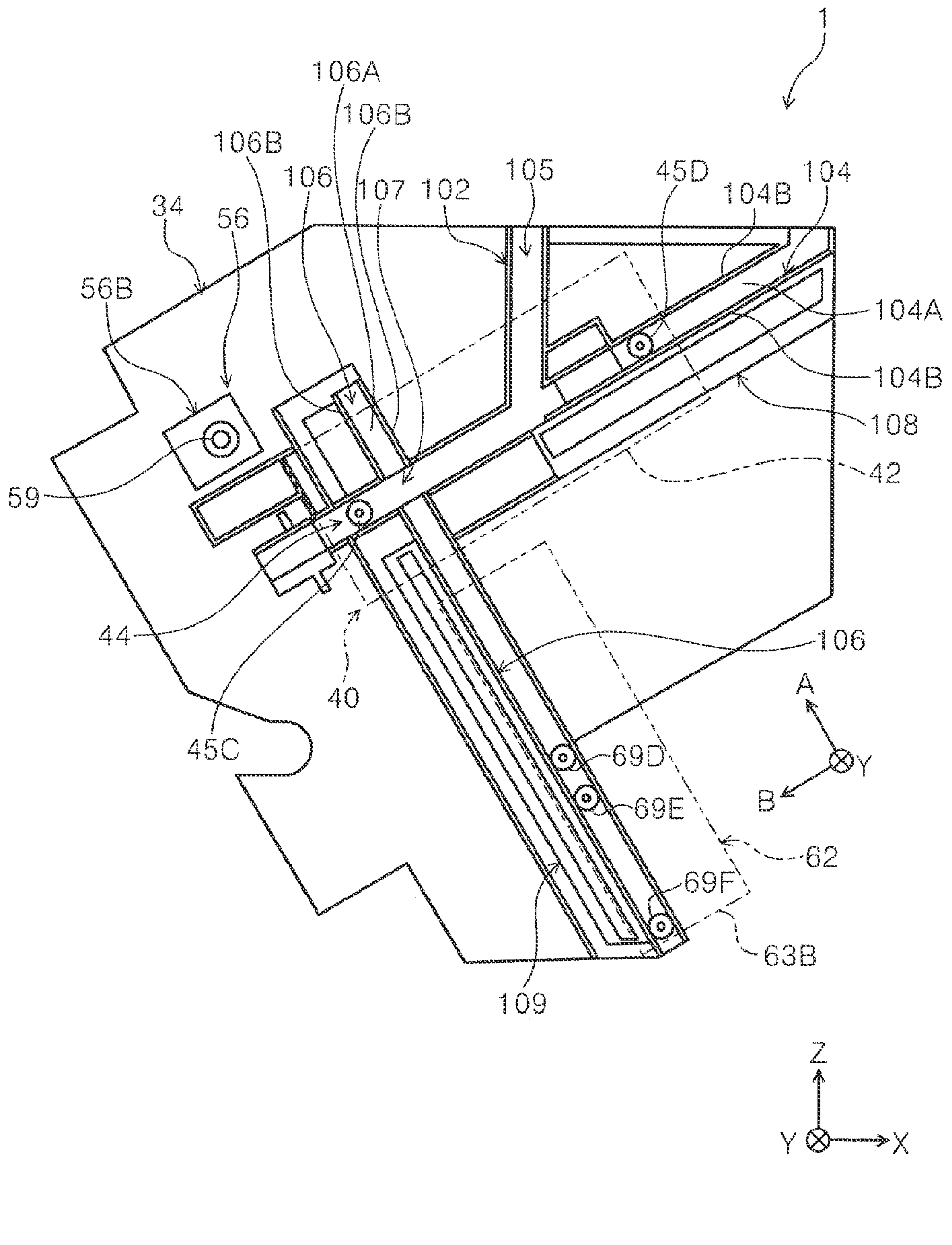
FIG. 4 is a diagram illustrating a structure of the other side portion in the apparatus depth direction of the printer according to the embodiment.

As illustrated in FIGS. 2 and 4, a side frame 32 and a side frame 34 are provided inside the casing 2 (refer to FIG. 1) of the printer 1 as an example of a set of side walls.

Figure 3:
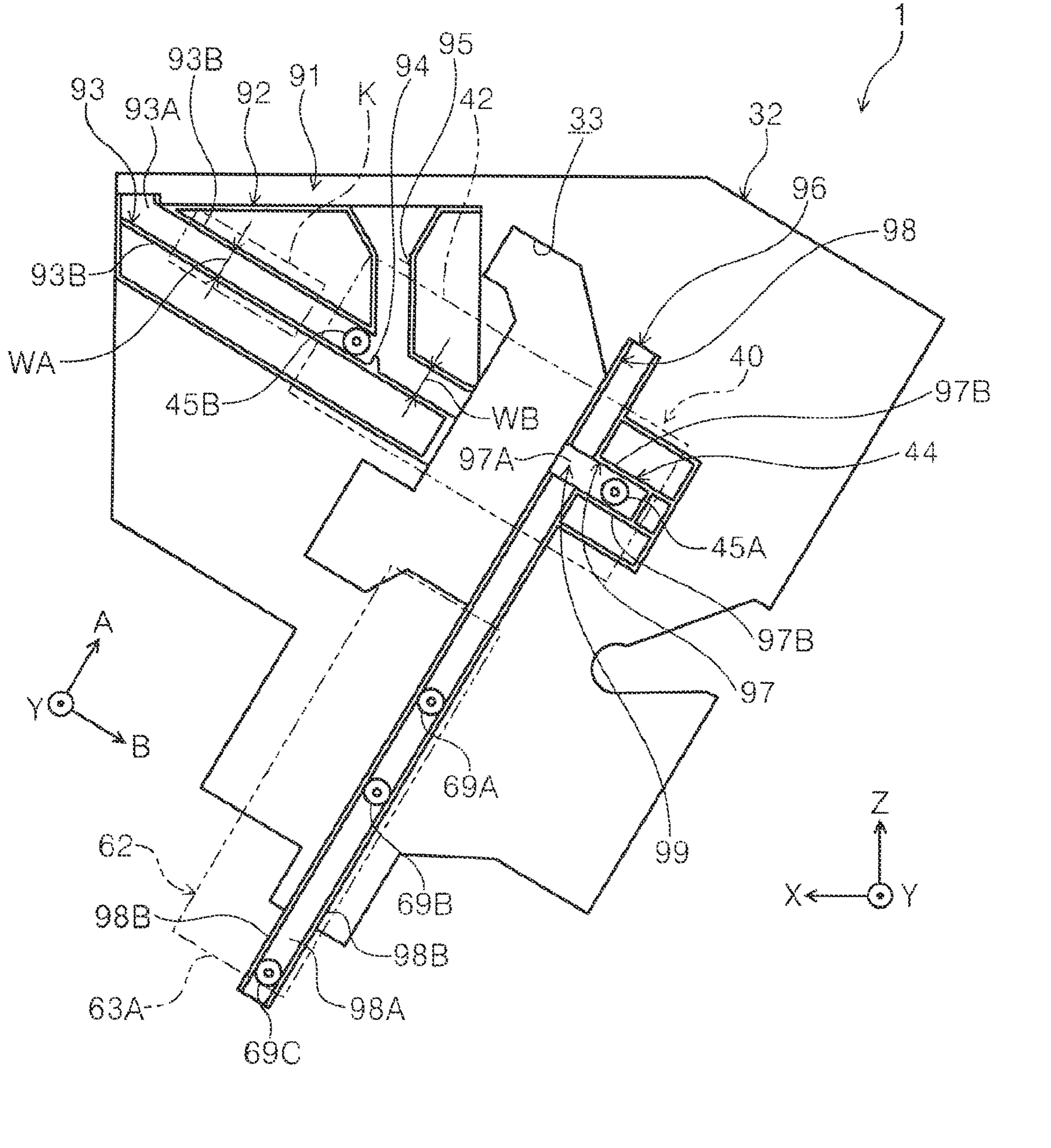
FIG. 3 is a diagram illustrating a structure of one side portion in an apparatus depth direction of the printer according to the embodiment.

As illustrated in FIG. 3, the side frame 32 is, for example, formed of a metal sheet, and stands upright along the AB plane and the XZ plane (refer to FIG. 1). In addition, the side frame 32 is an example of one of the side walls disposed in the −Y direction. The side frame 32 is formed with a through hole 33 penetrating the side frame 32 in the Y direction. The size and shape of the through hole 33 are such that a wiper unit 74, which will be described later, can pass through the through hole 33 in the Y direction.

As illustrated in FIG. 4, the side frame 34 is, for example, formed of a metal sheet and stands upright along the AB plane and the XZ plane (refer to FIG. 1). In addition, the side frame 34 is an example of the other of the side walls disposed in the +Y direction. The side frame 34 is not formed with the through hole 33 (FIG. 3). The side frame 34 and the side frame 32 (refer to FIG. 3) are disposed so as to face each other with a gap therebetween in the Y direction. The side frame 32 and the side frame 34 are coupled by lateral frames 35A, 35B, and 35C (refer to FIG. 2). The line head 40 is disposed in the space between the side frame 32 and the side frame 34.

As illustrated in FIG. 1, the printer 1 includes, as main portions, the line head 40 that records on the medium P, the transport unit 10 that transports the medium P while supporting the medium P, a head moving unit 50 that moves the line head 40 in the B direction (refer to FIG. 5), and a maintenance unit 60 that performs maintenance on the line head 40.

The transport unit 10 is an example of a support portion, and has two pulleys 14, a transport belt 15 that is endless and that is wound around the two pulleys 14, and a motor (not illustrated) that drives the pulleys 14. The medium P is transported in the A direction to a position facing the line head 40 while being attracted to the belt surface of the transport belt 15. As a method of attracting the medium P to the transport belt 15, a known attraction method such as an air suction method or an electrostatic suction method can be adopted. In this way, the transport belt 15 supports the medium P while attracting the medium P. The transport unit 10 is disposed so as to face the line head 40 in the B direction.

The line head 40 is an example of a recording head. In addition, the line head 40 has nozzles N that eject ink, which is an example of a liquid. The nozzles N are an example of an ejecting portion. In addition, the line head 40 is disposed so as to face the transport unit 10 in the B direction at a recording position described later, and records information on the medium P by ejecting ink from the nozzles N.

The line head 40 is an ink ejecting head configured so that the nozzles N that eject ink cover the entire area in the Y direction as the width direction of the medium P. The nozzle surface on which the nozzles N are disposed extends along the A direction and the Y direction. In addition, the line head 40 is configured as an ink ejecting head capable of recording in the entire area in the width direction of the medium P without moving in the width direction of the medium P. However, the type of ink ejecting head is not limited to this, and may be a type in which the ink ejecting head is mounted on a carriage and ejects ink while moving in the width direction of the medium P.

As illustrated in FIG. 2, the line head 40 extends in the Y direction. In addition, support frames 42 are respectively attached to two end portions of the line head 40 in the Y direction. Each of the support frames 42 is formed as a side plate along the AB plane, and extends in the −B direction with respect to the line head 40.

The line head 40 and the support frames 42 are disposed between the side frame 32 and the side frame 34 (refer to FIG. 4). That is, the line head 40 is designed to be moved in the B direction between the side frame 32 and the side frame 34.

As illustrated in FIG. 3, the support frame 42 in the −Y direction is provided with a protruding portion 44 that protrudes outward in the −Y direction. The protruding portion 44 has rollers 45A and 45B as examples of rotary members provided on the support frame 42 so as to rotate. The rollers 45A and 45B are disposed in a line and with an interval therebetween in the B direction. The roller 45A is located at an end portion of the support frame 42 in the +B direction. The roller 45B is located at an end portion of the support frame 42 in the −B direction.

As illustrated in FIG. 4, the support frame 42 in the +Y direction is provided with a protruding portion 44 that protrudes outward in the +Y direction. The protruding portion 44 has rollers 45C and 45D as examples of rotary members provided on the support frame 42 so as to rotate. The rollers 45C and 45D are disposed in a line and with an interval therebetween in the B direction. The roller 45C is located at an end portion of the support frame 42 in the +B direction. The roller 45D is located at an end portion of the support frame 42 in the −B direction.

The rollers 45A and 45B (refer to FIG. 3) and the rollers 45C and 45D have, for example, the similar configuration. Although not illustrated, when the rollers 45A, 45B, 45C, and 45D are not distinguished from each other, they are referred to as a plurality of rollers 45. The plurality of rollers 45 are rotated through contact with a guide rail 93 (refer to FIG. 3) and a guide rail 104, which will be described later, and are guided in the B direction. Further, three or more of the plurality of rollers 45 may be disposed on the protruding portion 44 in the −Y direction and three or more of the plurality of rollers 45 may be disposed on the protruding portion 44 in the +Y direction.

In addition, the roller 45A is an example of one rotary member. The rollers 45B, 45C, and 45D are examples of other rotary members. For example, the arrangement of the rollers 45A, 45B, 45C, and 45D is predetermined so that the rollers 45B, 45C, and 45D are guided by the guide rails 93 and 104, which are described later, when the roller 45A is located in a second movement area S2 (refer to FIG. 8) described later.

The length corresponding to the distance between the roller 45A and the roller 45B in the B direction and the length corresponding to the distance between the roller 45C and the roller 45D in the B direction are each longer than the length corresponding to the width of the through hole 33 in the B direction.

Figure 5:
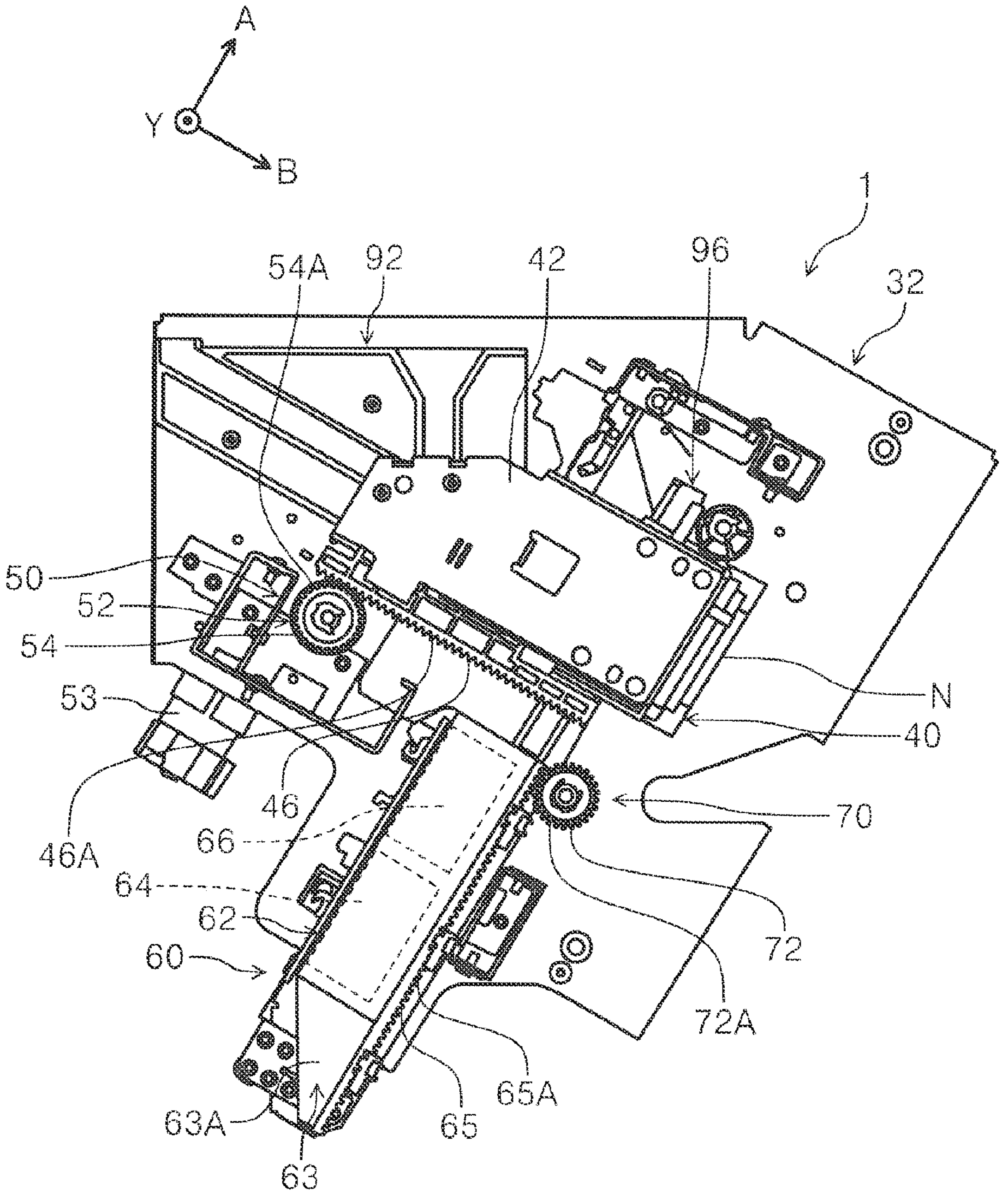
FIG. 5 is a diagram illustrating a drive unit of the line head and a drive unit of a cap unit in the printer according to the embodiment.

As illustrated in FIG. 5, the support frame 42 is provided with a rack 46. The rack 46 is a plate-shaped member the thickness direction of which is the Y direction, and extends in the B direction. A plurality of tooth portions 46A disposed in line in the B direction are formed at an end portion of the rack 46 in the −A direction.

The head moving unit 50 is an example of a movement mechanism. In addition, the head moving unit 50 moves the line head 40 to a recording position and a retracted position, which will be described later, along the B direction in which the line head 40 moves back and forth with respect to the transport unit 10. In other words, the head moving unit 50 moves the line head 40 in the B direction so that the movement direction of the line head 40 intersects both the vertical direction and the horizontal direction.

The head moving unit 50, for example, includes a drive unit 52 that drives the line head 40 in the B direction and an adjustment unit 56 (refer to FIG. 4) that adjusts the position of the line head 40 in the B direction. The head moving unit 50 moves the line head 40 to the retracted position away from the transport unit 10 (refer to FIG. 1) with respect to the recording position. The recording position and retracted position of the line head 40 will be described later.

The drive unit 52 is formed of a motor 53 and a pinion 54, and driving is controlled by the control portion 26 (refer to FIG. 1). The pinion 54 has a plurality of tooth portions 54A. The plurality of tooth portions 54A mesh with the plurality of tooth portions 46A.

The motor 53 rotates the pinion 54 in one direction or the opposite direction. In this way, the drive unit 52 rotationally drives the pinion 54 to move the line head 40 in the B direction.

Figure 6:
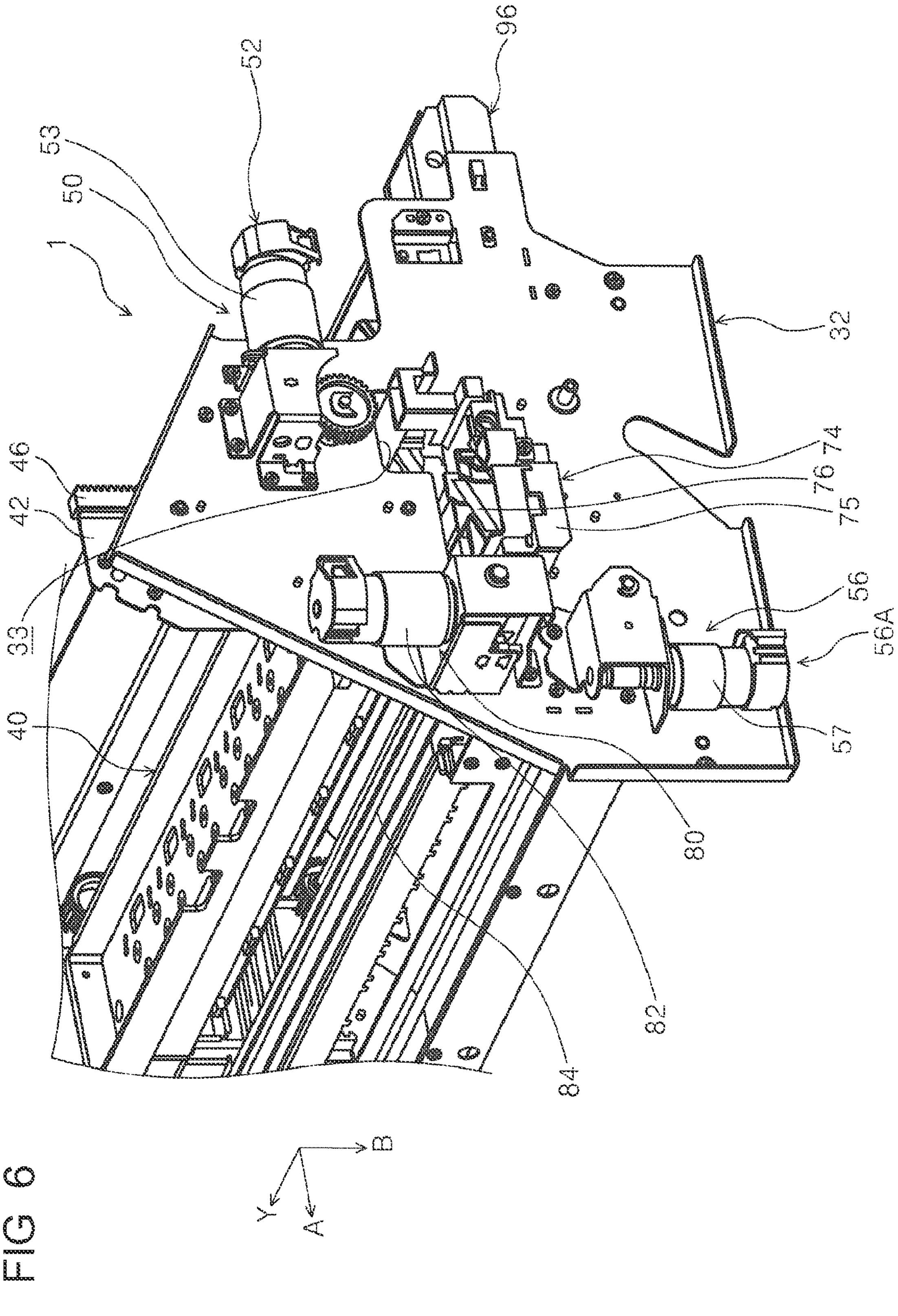
FIG. 6 is a perspective view illustrating a retracted state of a wiper unit of the printer according to the embodiment.

As illustrated in FIG. 6, the adjustment unit 56 is provided on the side frame 32. In addition, the adjustment unit 56, for example, is formed of an automatic adjustment portion 56A having a motor 57 that drives an eccentric cam (not illustrated) and a shaft 59 (refer to FIG. 4), and a manual adjustment portion 56B (refer to FIG. 4) provided on the side frame 34 (refer to FIG. 4). In the automatic adjustment portion 56A, the recording position of the line head 40 is adjusted by the eccentric cam (not illustrated) coming into contact with a portion of the line head 40. In the manual adjustment portion 56B, the inclination of the line head 40 is adjusted by an adjustment screw (not illustrated) that adjusts the position of the shaft 59 being rotated.

As illustrated in FIG. 2, the maintenance unit 60 includes a cap unit 62 as an example of a cap portion and the wiper unit 74 as an example of a cleaning portion. The cap unit 62 functions as a first maintenance unit that covers the nozzles N. The wiper unit 74 functions as a second maintenance unit that cleans the ejection surface of the nozzles N.

The cap unit 62 is provided so as to be movable in the A direction by a drive unit 70 (refer to FIG. 5) described later. Specifically, the cap unit 62 is configured to include a unit body 63, a cover portion 64 that covers the nozzles N, and the flushing portion 66 that covers the nozzles N and receives ink ejected from the nozzles N.

In addition, the cap unit 62 includes the cover portion 64 and the flushing portion 66 along the A direction, and also, by moving in the A direction, switches between a state in which the cover portion 64 faces the nozzles N and a state in which the flushing portion 66 faces the nozzles N.

Furthermore, the cap unit 62 has a standby position upstream of the line head 40 in the A direction, and has the standby position, an ejection position, and a cap position in this order from upstream to downstream in the A direction. The ejection position is the position of the cap unit 62 when the flushing portion 66 faces the nozzles N. The cap position is the position of the cap unit 62 when the cover portion 64 covers the nozzles N.

The unit body 63 is formed in a box shape that is long in the Y direction and short in the A direction. The unit body 63 is formed with an opening portion 68 that is open in the −B direction. In addition, the unit body 63 has a side plate 63A located in the −Y direction (refer to FIG. 3) and a side plate 63B located in the +Y direction (refer to FIG. 4). The side plate 63A and the side plate 63B face each other in the Y direction.

A partition wall 67 is provided inside the unit body 63. The partition wall 67 divides the space in the unit body 63 into a space in the +A direction and a space in the −A direction. The cover portion 64 is disposed in the space in the −A direction of the partition wall 67, and the flushing portion 66 is disposed in the space in the +A direction of the partition wall 67.

The size and shape of the cover portion 64 are a size and shape that cover the ejection surface NA of the nozzles N. In addition, the cover portion 64 covers the ejection surface NA by being disposed so as to face the ejection surface NA in the B direction. By covering the ejection surface NA with the cover portion 64, drying of the nozzles N is suppressed, and an increase in the viscosity of the ink is suppressed. Further, the cover portion 64 is configured to cover the nozzles N when the line head 40 is located at the retracted position described later.

The flushing portion 66 is an example of a receiving portion and is provided inside the opening portion 68. In addition, the flushing portion 66 is disposed downstream of the cover portion 64 in the A direction. In other words, when the cap unit 62 is disposed in the standby position, the flushing portion 66 is disposed nearer to the line head 40 than is the cover portion 64 in the A direction. In addition, the flushing portion 66 is formed as a flushing box that is open in the −B direction and that has porous fibers such as felt. The flushing portion 66 captures ink ejected from the nozzles N. When the viscosity of the ink increases in the nozzles N, the viscosity of the ink is maintained within a set range by ejecting the ink toward the flushing portion 66. As a result, defective ink ejection from the nozzles N is suppressed.

As illustrated in FIG. 5, a rack 65 extending in the A direction is formed on the unit body 63. The rack 65 has a plurality of tooth portions 65A disposed in line in the A direction.

As illustrated in FIG. 3, rollers 69A, 69B, and 69C are provided in the side plate 63A in the −Y direction so as to rotate with the Y direction as the axial direction. The rollers 69A, 69B, and 69C protrude from the side plate 63A in the −Y direction. The rollers 69A, 69B, and 69C have similar configurations, but differ only in terms of their arrangement. In addition, the rollers 69A, 69B, and 69C are disposed in this order from downstream to upstream in the A direction. The distance between the roller 69A and the roller 69B is, for example, smaller than the distance between the roller 69B and the roller 69C.

As illustrated in FIG. 4, rollers 69D, 69E, and 69F are provided on the side plate 63B in the +Y direction so as to rotate with the Y direction as the axial direction. The rollers 69D, 69E, and 69F protrude from the side plate 63B in the +Y direction. The rollers 69D, 69E, and 69F have the similar configurations as the rollers 69A, 69B, and 69C (refer to FIG. 3), but differ only in terms of their arrangement. In addition, the rollers 69D, 69E, and 69F are disposed in this order from downstream to upstream in the A direction. The distance between the roller 69D and the roller 69E is, for example, smaller than the distance between the roller 69E and the roller 69F. The positions of the rollers 69D and 69E in the A direction are, for example, different from the positions of the rollers 69A and 69B in the A direction.

Although not illustrated, when the rollers 69A, 69B, 69C, 69D, 69E, and 69F are not distinguished from each other, they are referred to as a plurality of rollers 69. The plurality of rollers 69 are an example of a plurality of lateral protruding portions. In addition, the plurality of rollers 69 are rotated through contact with a guide rail 98 and a guide rail 106, which will be described later, and are guided in the A direction. Further, three or more of the plurality of rollers 69 may be disposed on the side plate 63A in the −Y direction and three or more of the plurality of rollers 69 may be disposed on the side plate 63B in the +Y direction.

In addition, the roller 69A is an example of one lateral protruding portion. The rollers 69B, 69C, 69D, 69E, and 69F are examples of the other lateral protruding portions. For example, the arrangement of the rollers 69A, 69B, 69C, 69D, 69E, and 69F is predetermined so that the rollers 69B, 69C, 69D, 69E, and 69F are guided by the guide rails 98 and 106, which will be described later, when the roller 69A is located at an intersection portion 99 (refer to FIG. 3) described later.

As illustrated in FIG. 5, the drive unit 70 has a pinion 72 and a motor (not illustrated) that rotates the pinion 72. Drive control of the drive unit 70 is performed by the control portion 26 (refer to FIG. 1). The pinion 72 has a plurality of tooth portions 72A. The plurality of tooth portions 72A mesh with the plurality of tooth portions 65A.

When the line head 40 is located at the retracted position described later, the drive unit 70 advances the cap unit 62 to a position between the line head 40 and the transport unit 10 (refer to FIG. 1). In addition, before the line head 40 is positioned at the recording position described later, the drive unit 70 retracts the cap unit 62 from between the line head 40 and the transport unit 10 in the −A direction.

As described above, the cap unit 62 is provided so as to be capable of moving back and forth between the line head 40 and the transport unit 10 in the A direction intersecting the B direction, and when the line head 40 is located at the retracted position described later, the cap unit 62 is configured to cover the nozzles N.

As illustrated in FIG. 6, the wiper unit 74 includes a body portion 75 and a blade 76 as an example of a cleaning member. In addition, the wiper unit 74 is configured to be able to pass through the through hole 33. The body portion 75 is formed in a box shape that is open in the −B direction. The blade 76 is, for example, formed of a rectangular plate-shaped rubber. In addition, the blade 76 is provided on the body portion 75 in a state where the portion for wiping the nozzles N (refer to FIG. 1) protrudes from the body portion 75 in the −B direction and is inclined with respect to the A direction and the Y direction.

The wiper unit 74 can be moved back and forth in the Y direction by a drive unit 80. The position where the wiper unit 74 is stationary in the −Y direction with respect to the side frame 32 is referred to as a retracted position of the wiper unit 74. In addition, the position where the wiper unit 74 is moved in the +Y direction with respect to the side frame 32 is referred to as an advanced position of the wiper unit 74. The wiper unit 74 is retracted in the −Y direction with respect to the side frame 32 when the cap unit 62 covers the line head 40 and when the line head 40 performs recording.

The drive unit 80 includes, for example, a motor 82 and a belt 84 to which the wiper unit 74 is attached, and the belt 84 is orbitally moved by rotation of the motor 82, and thus the wiper unit 74 is moved in the Y direction.

In this way, the wiper unit 74 is provided so as to be capable of moving back and forth between the line head 40 and the transport unit 10 (refer to FIG. 1) in the Y direction intersecting both the B direction and the A direction, and cleans the line head 40 when the line head 40 is located at the retracted position described later.

As illustrated in FIG. 3, the side frame 32 is provided with a guide member 91 as an example of a guide member that guides the line head 40 in the B direction.

The guide member 91 is divided in the B direction by the through hole 33. In other words, the guide member 91 is divided in the B direction by the second movement area S2 (refer to FIG. 8) described later. Specifically, the guide member 91 is formed of a first guide member 92 and a second guide member 96.

The first guide member 92 is provided at a portion of the side frame 32 on the −B direction side of the through hole 33. In addition, the first guide member 92 has the guide rail 93 as an example of a longitudinal groove portion.

The guide rail 93 is formed to have a U-shape in section that is open in the +Y direction toward the line head 40, and extends substantially linearly with the B direction as a guide direction. The guide rail 93 guides the rollers 45A and 45B of the protruding portion 44 in the B direction.

In particular, the guide rail 93 has a bottom wall 93A disposed along the XZ plane and a set of side walls 93B standing upright in the Y direction from two end portions of the bottom wall 93A in the A direction. An end portion of the guide rail 93 in the −B direction is open in the +Z direction. An end portion of the guide rail 93 in the +B direction is located at the edge portion of the through hole 33 and is open toward the through hole 33. A restricting portion 94 is formed between the center of the guide rail 93 in the B direction and the end portion of the guide rail 93 in the +B direction.

The restricting portion 94 is a portion protruding from the side wall 93B in the −A direction toward the inside of the guide rail 93. In addition, the restricting portion 94 is located on the +B direction side of the roller 45B, and restricts the roller 45B from moving to the +B direction side of the restricting portion 94.

A widened portion K that is wider in the A direction than other portions is formed in a portion of the guide rail 93 in the −B direction with respect to the restricting portion 94. In the widened portion K, the width of the guide rail 93 in the A direction is referred to as a width WA. In addition, in the portion of the guide rail 93 on the +B direction side of the restricting portion 94, the width in the A direction is referred to as a width WB. Here, the width WA is larger than the width WB. Further, the lengths in the A direction corresponding to the width WA and the width WB are longer than the lengths corresponding to the diameters of the rollers 45B and 45A, respectively.

In the side wall 93B in the +A direction, some of a portion thereof located on the +B direction side of the restricting portion 94 is cut out. One end portion of a guide rail 95 is coupled to the cut-out portion of the side wall 93B.

The guide rail 95 is formed to have a U-shape in section that is open in the +Y direction, and has the same width as the guide rail 93. In addition, the guide rail 95 extends in the +Z direction from a junction portion with the guide rail 93.

Here, after the roller 45B has been guided in the −B direction by the guide rail 93, the line head 40 is guided in the +Z direction, and the line head 40 is designed to be separated from the first guide member 92 in the +Z direction by guiding the roller 45A in the +Z direction by the guide rail 95.

The second guide member 96 is provided at a portion of the side frame 32 on the +B direction side of the through hole 33. In addition, the second guide member 96 includes a guide rail 97 as an example of a longitudinal groove portion that guides the line head 40 in the B direction, and the guide rail 98 as an example of a lateral groove portion that intersects the guide rail 97 and guides the cap unit 62 in the A direction.

The guide rail 97 extends in the B direction. The guide rail 98 extends in the A direction. The guide rail 97 and the guide rail 98 are perpendicular to each other as an example of an intersection. The portion where the guide rail 97 and the guide rail 98 intersect is referred to as the intersection portion 99. The intersection portion 99 is located at an end portion of the guide rail 97 in the −B direction. That is, the guide rail 97 and the guide rail 98 are disposed in a T shape.

The guide rail 97 is formed to have a U-shape in section that is open in the +Y direction toward the line head 40, and extends linearly in the B direction as a guide direction. The center axis of the guide rail 97 and the center axis of the guide rail 93 are substantially the same. The length of the guide rail 97 in the B direction is shorter than the length of the guide rail 93 in the B direction. Therefore, the guide rail 97 guides only the roller 45A in the B direction.

In particular, the guide rail 97 has a bottom wall 97A disposed along the XZ plane and a set of side walls 97B standing upright in the Y direction from two end portions of the bottom wall 97A in the A direction. An end portion of the guide rail 97 in the −B direction is open in the +Z direction. An end portion of the guide rail 97 in the +B direction is closed. Further, the width of the guide rail 97 in the A direction is substantially the same as the width WB. The height of the side walls 97B at the intersection portion 99 is lower than the height of the side walls 97B on the +B direction side of the intersection portion 99. In other words, the depth of the guide rail 97 in the Y direction is larger than the depth of the guide rail 98 in the Y direction.

The guide rail 98 is formed to have a U-shape in section that is open in the +Y direction toward the cap unit 62, and extends linearly with the A direction as a guide direction. In addition, the guide rail 98 is divided at the intersection portion 99. The length of the guide rail 98 on the +A direction side of the intersection portion 99 is shorter than the length of the guide rail 98 on the −A direction side of the intersection portion 99. Therefore, the guide rail 98 on the +A direction side of the intersection portion 99 guides only the roller 69A in the A direction.

Specifically, the guide rail 98 has a bottom wall 98A disposed along the XZ plane and a set of side walls 98B standing upright in the Y direction from two end portions of the bottom wall 98A in the B direction. Both end portions of the guide rail 98 in the A direction are open. The length corresponding to the width of the guide rail 98 in the B direction is longer than the lengths corresponding to the diameters of the rollers 69A, 69B, and 69C. The height of the side walls 98B in the Y direction is lower than the height of the side walls 97B in the Y direction.

As illustrated in FIG. 4, the side frame 34 is provided with a guide member 102 as an example of a guide member.

The guide member 102 has the guide rail 104 that guides the line head 40 in the B direction, a guide rail 105 that extends in the Z direction from a portion of the guide rail 104, and the guide rail 106 that intersects the guide rail 104 and guides the cap unit 62 in the A direction. The guide rail 104 is an example of a longitudinal groove portion. The guide rail 106 is an example of a lateral groove portion.

The guide rail 104 extends in the B direction. The guide rail 106 extends in the A direction. The guide rail 104 and the guide rail 106 are perpendicular to each other as an example of an intersection. The portion where the guide rail 104 and the guide rail 106 intersect is referred to as an intersection portion 107.

The guide rail 104 is formed to have a U-shape in section that is open in the +Y direction toward the line head 40, and extends linearly in the B direction as a guide direction. The guide rail 104 is not divided at the intersection portion 107. That is, the guide rail 104 is continuous in the B direction at the intersection portion 107. The length of the guide rail 104 in the B direction is longer than the total length of the length of the guide rail 93 (refer to FIG. 3) in the B direction and the length of the guide rail 97 (refer to FIG. 3) in the B direction.

In particular, the guide rail 104 has a bottom wall 104A disposed along the XZ plane, and a set of side walls 104B that stand upright in the Y direction from two end portions of the bottom wall 104A in the A direction. An end portion of the guide rail 104 in the −B direction is open in the +Z direction. An end portion of the guide rail 104 in the +B direction is closed.

The width of the guide rail 104 in the A direction is substantially the same as the width WB (refer to FIG. 3). The height of the side walls 104B at the intersection portion 107 is lower than the height of the side walls 104B at other than the intersection portion 107. In other words, the depth of the guide rail 104 in the Y direction is larger than the depth of the guide rail 106 in the Y direction.

Further, the guide rail 104 is, for example, provided with a restricting bracket 108 that suppresses the roller 45D from coming off from the guide rail 104.

The guide rail 106 is formed to have a U-shape in section that is open in the +Y direction toward the cap unit 62, and extends linearly with the A direction as a guide direction. In addition, the guide rail 106 is divided at the intersection portion 107. The length of the guide rail 106 on the +A direction side of the intersection portion 107 is shorter than the length of the guide rail 106 on the −A direction side of the intersection portion 107. However, the guide rail 106 on the +A direction side of the intersection portion 107 can guide the rollers 69D and 69E in the A direction.

Specifically, the guide rail 106 has a bottom wall 106A disposed along the XZ plane and a set of side walls 106B standing upright in the Y direction from two end portions of the bottom wall 106A in the B direction. Both end portions of the guide rail 106 in the A direction are open. The length corresponding to the width of the guide rail 106 in the B direction is longer than the lengths corresponding to the diameters of the rollers 69D, 69E, and 69F. The height of the side walls 106B in the Y direction is lower than the height of the side walls 104B in the Y direction.

Further, the guide rail 106 is, for example, provided with a restricting bracket 109 that suppresses the rollers 69D, 69E, and 69F from coming off from the guide rail 106.

Figure 7:
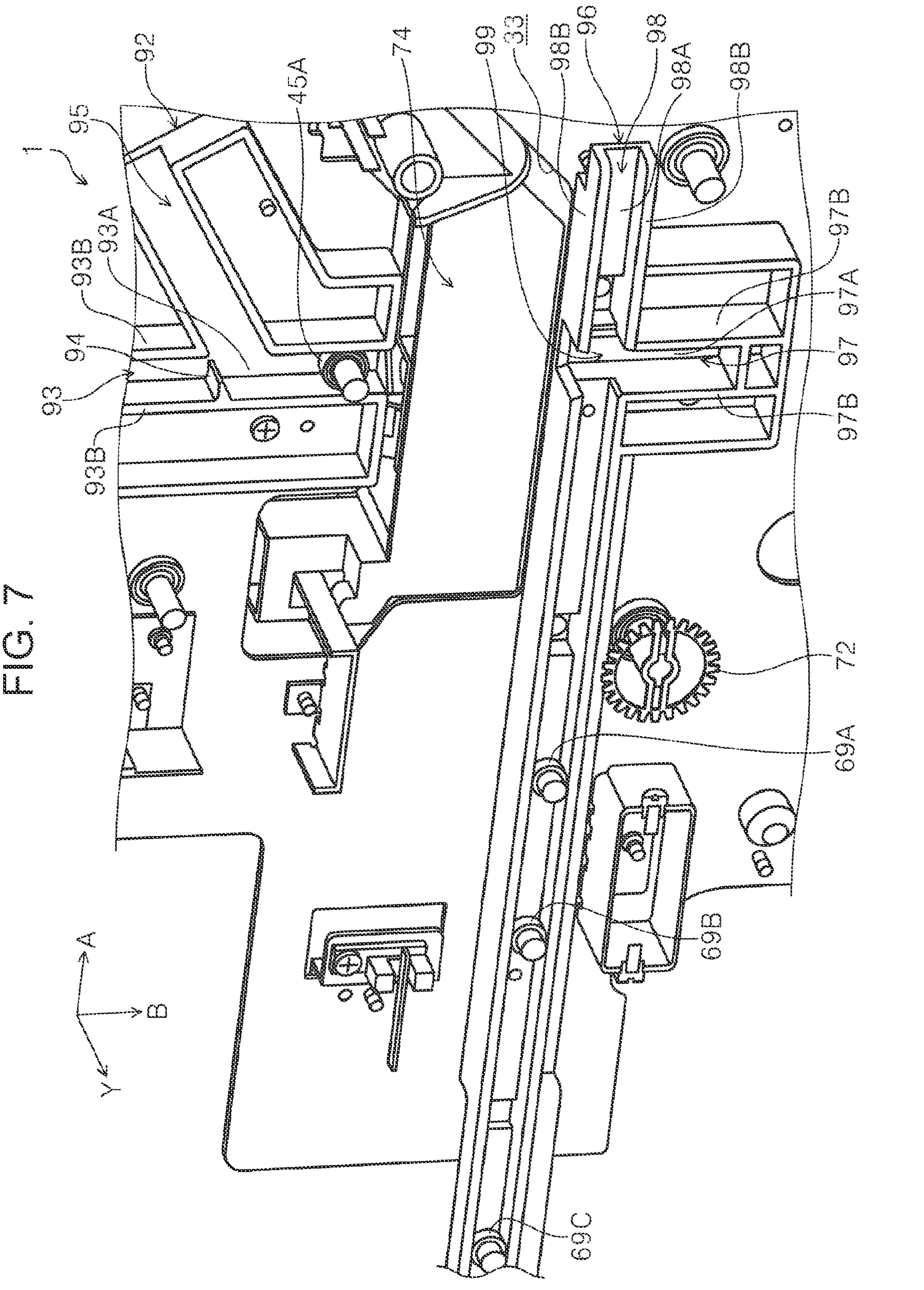
FIG. 7 is an enlarged perspective view of the one side portion of the printer according to the embodiment.

As illustrated in FIG. 7, the bottom wall 93A and the bottom wall 97A are located at substantially the same positions in the +Y direction. As a result, the roller 45A guided by the guide rail 93 can easily enter the guide rail 97.

In the Y direction, the depth of the guide rail 93 and the depth of the guide rail 97 are each larger than the depth of the guide rail 98. In addition, the bottom wall 98A is located higher than the bottom wall 93A in the +Y direction. The length corresponding to the depth from the surface of the bottom wall 93A to the surface of the bottom wall 98A is longer than the length corresponding to the width of the roller 45 in the Y direction. As a result, at the intersection portion 99, when the roller 45A is guided by the side walls 97B, the roller 45A is suppressed from being offset with respect to the guide rail 97.

Each position in the B direction when the line head 40 illustrated in FIG. 2 is moved by the head moving unit 50 will be described.

Figure 9:
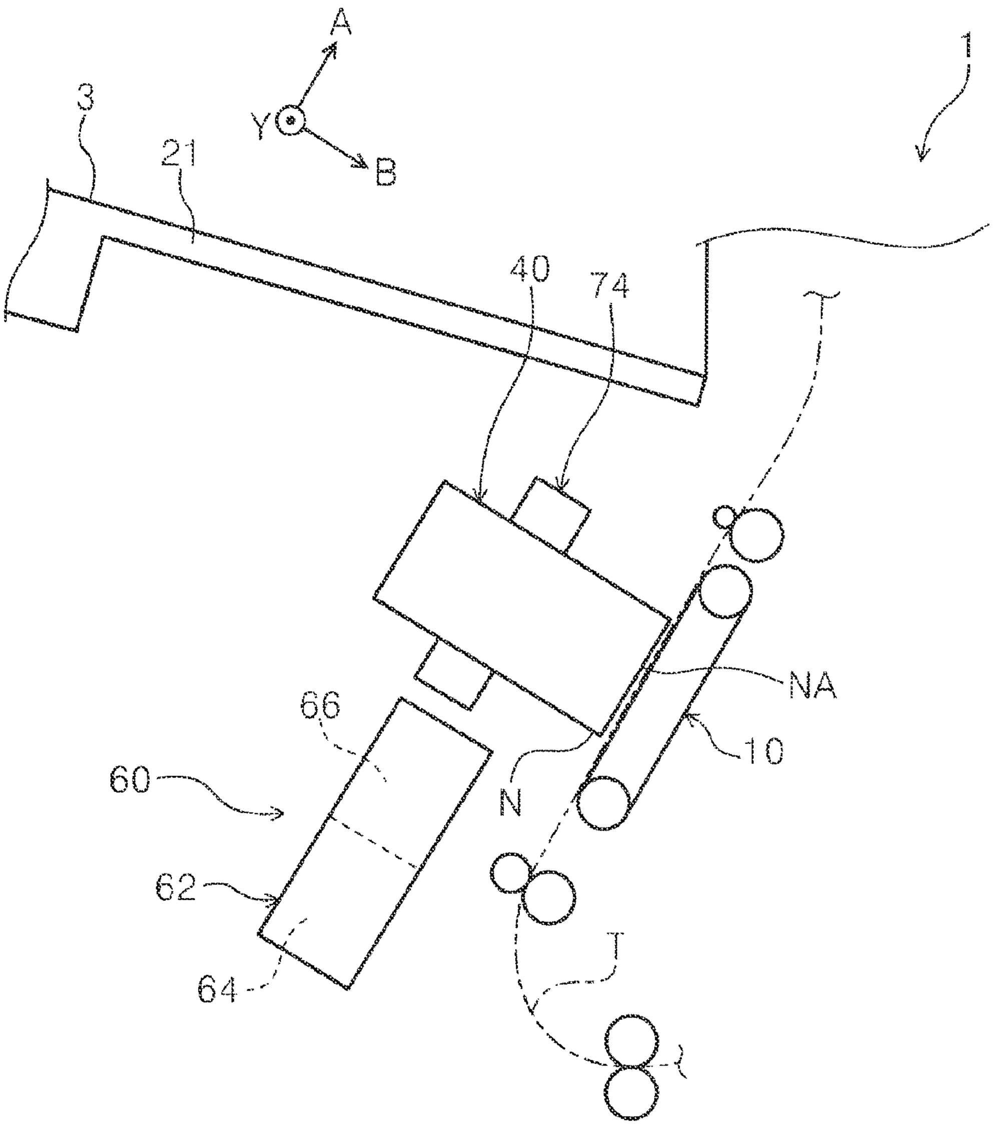
FIG. 9 is a schematic view illustrating a state in which the line head according to the embodiment is in a recording position.

As illustrated in FIG. 9, the recording position of the line head 40 refers to a stationary position of the line head 40 at which recording of information on the medium P can be performed by the line head 40. Further, since the recording position can be adjusted by the adjustment unit 56 (FIG. 6), there are one or more recording positions.

The retracted position of the line head 40 refers to a stationary position of the line head 40 at which the line head 40 is separated farther from the transport unit 10 in the −B direction than is the recording position. The retracted position of the line head 40 includes a first position, a second position, a third position, a standby position, and a replacement position, which will be described later.

Figure 10:
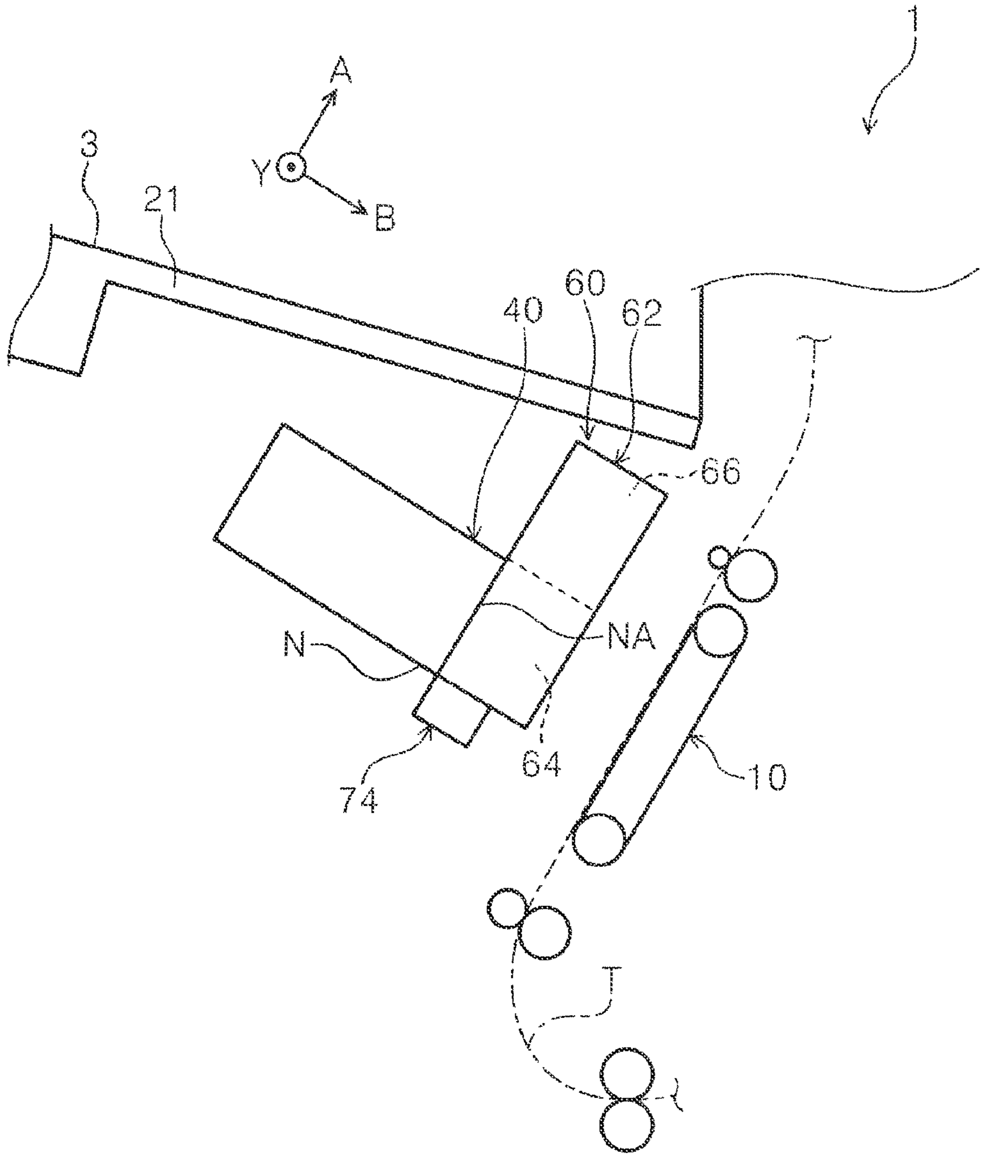
FIG. 10 is a schematic view illustrating a state in which the line head according to the embodiment is in a first position.

As illustrated in FIG. 10, the first position of the line head 40 refers to the position of the line head 40 at which the cover portion 64 covers the nozzles N in the B direction.

Figure 11:
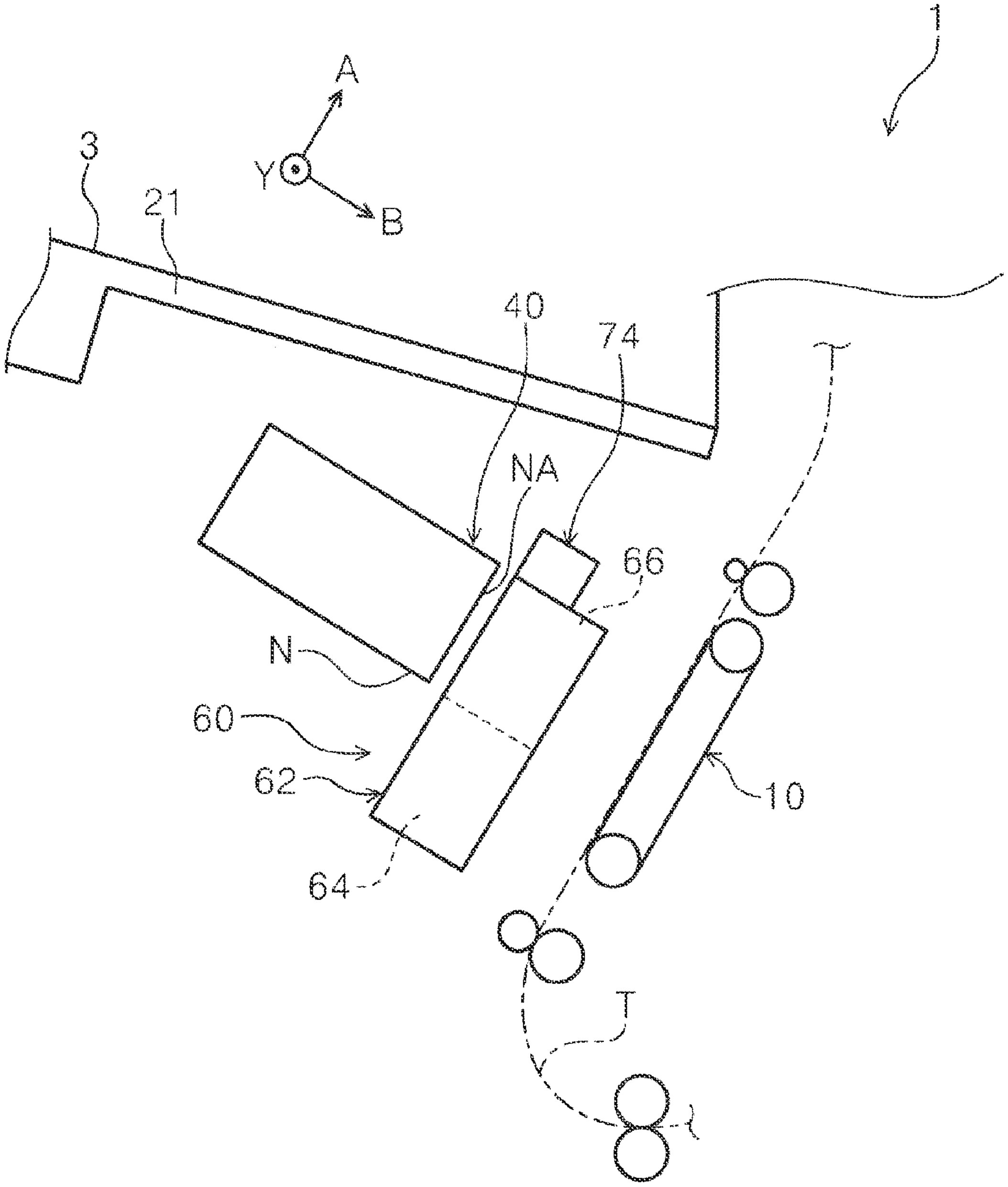
FIG. 11 is a schematic view illustrating a state in which the line head according to the embodiment is in a second position.

As illustrated in FIG. 11, the second position of the line head 40 refers to the position of the line head 40 that is away from the first position and at which the flushing portion 66 faces the nozzles N in the B direction. Further, at the second position, the flushing portion 66 may be in contact with the nozzles N.

Figure 14:
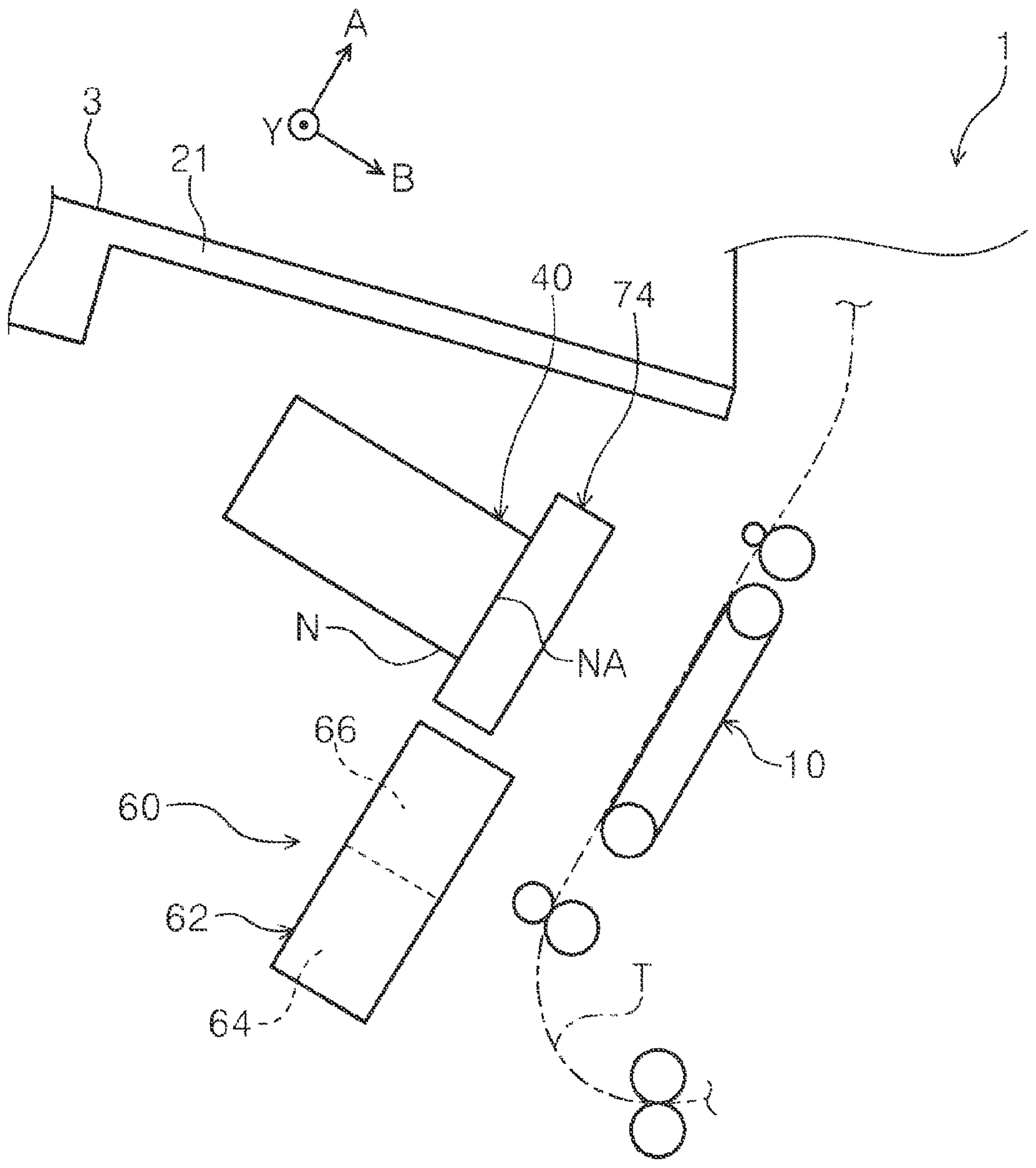
FIG. 14 is a schematic view illustrating a state in which the line head according to the embodiment is cleaned by the wiper unit.

As illustrated in FIG. 14, the third position of the line head 40 refers to the position of the line head 40 in the B direction at which the wiper unit 74 can clean the ejection surface NA of the nozzles N.

Further, although not illustrated, the standby position of the line head 40 refers to a position in the B direction farther from the transport unit 10 than are the first, second, and third positions. This is a standby position where, when the cover portion 64, the flushing portion 66, and the wiper unit 74 move, the line head 40 stands by until the movement is completed. In addition, the replacement position of the line head 40 refers to a position in the B direction farther from the transport unit 10 than the standby position in the B direction. In other words, the replacement position of the line head 40 is the position farthest from the transport unit 10 in the B direction.

Figure 12:
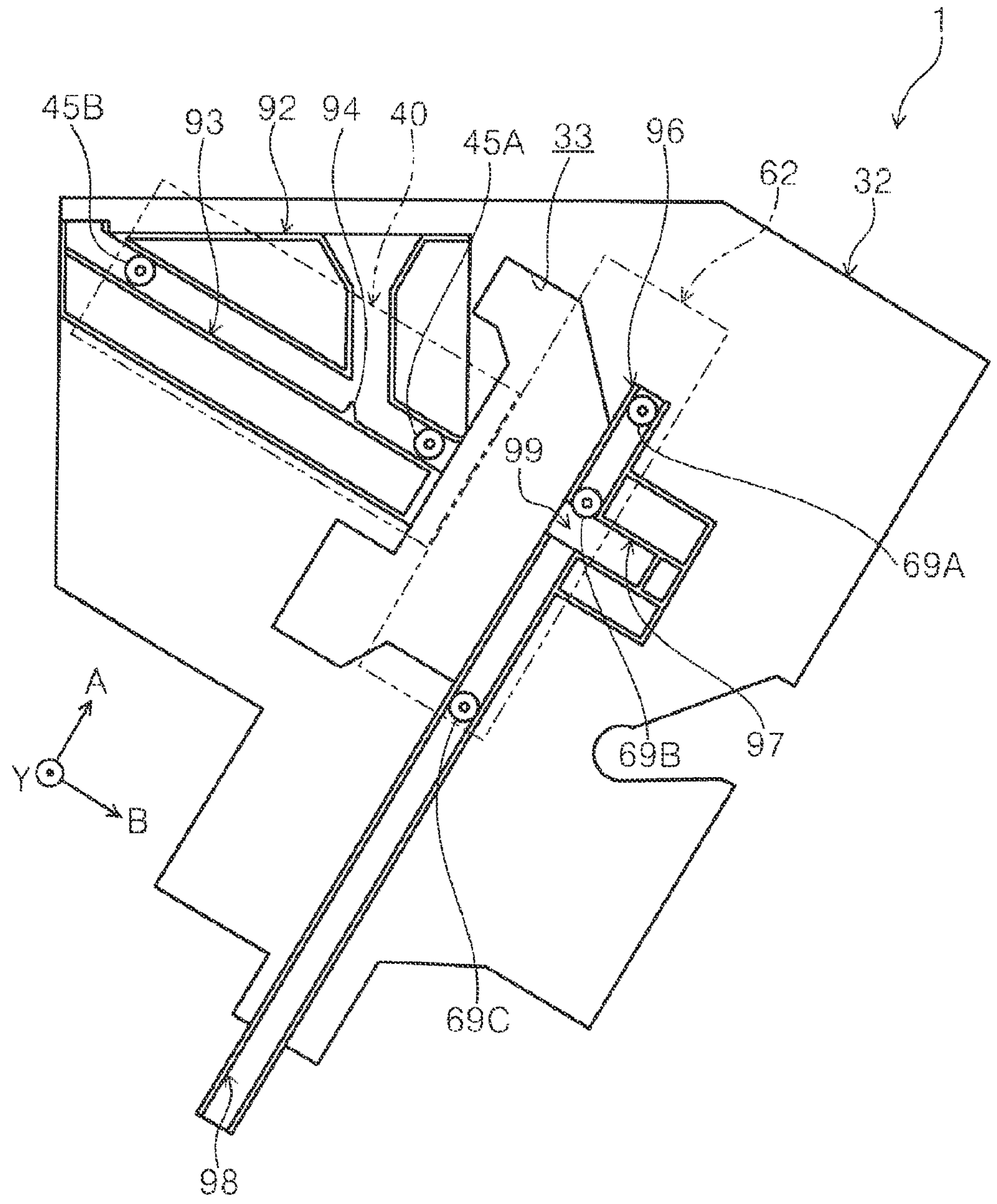
FIG. 12 is a diagram illustrating positions of rollers of the line head and rollers of the cap unit when the line head according to the embodiment is in the first position.

As illustrated in FIG. 12, when the line head 40 is in the first position, and the cover portion 64 (refer to FIG. 10) covers the nozzles N (refer to FIG. 10), the roller 45A is located in a +B direction end portion of the guide rail 93. The roller 45B is located on the −B direction side of the B-direction center of the guide rail 93. In addition, the roller 69A and the roller 69B are located on the +A direction side of the intersection portion 99 of the guide rail 98. The roller 69C is located on the −A direction side of the intersection portion 99 of the guide rail 98.

Figure 13:
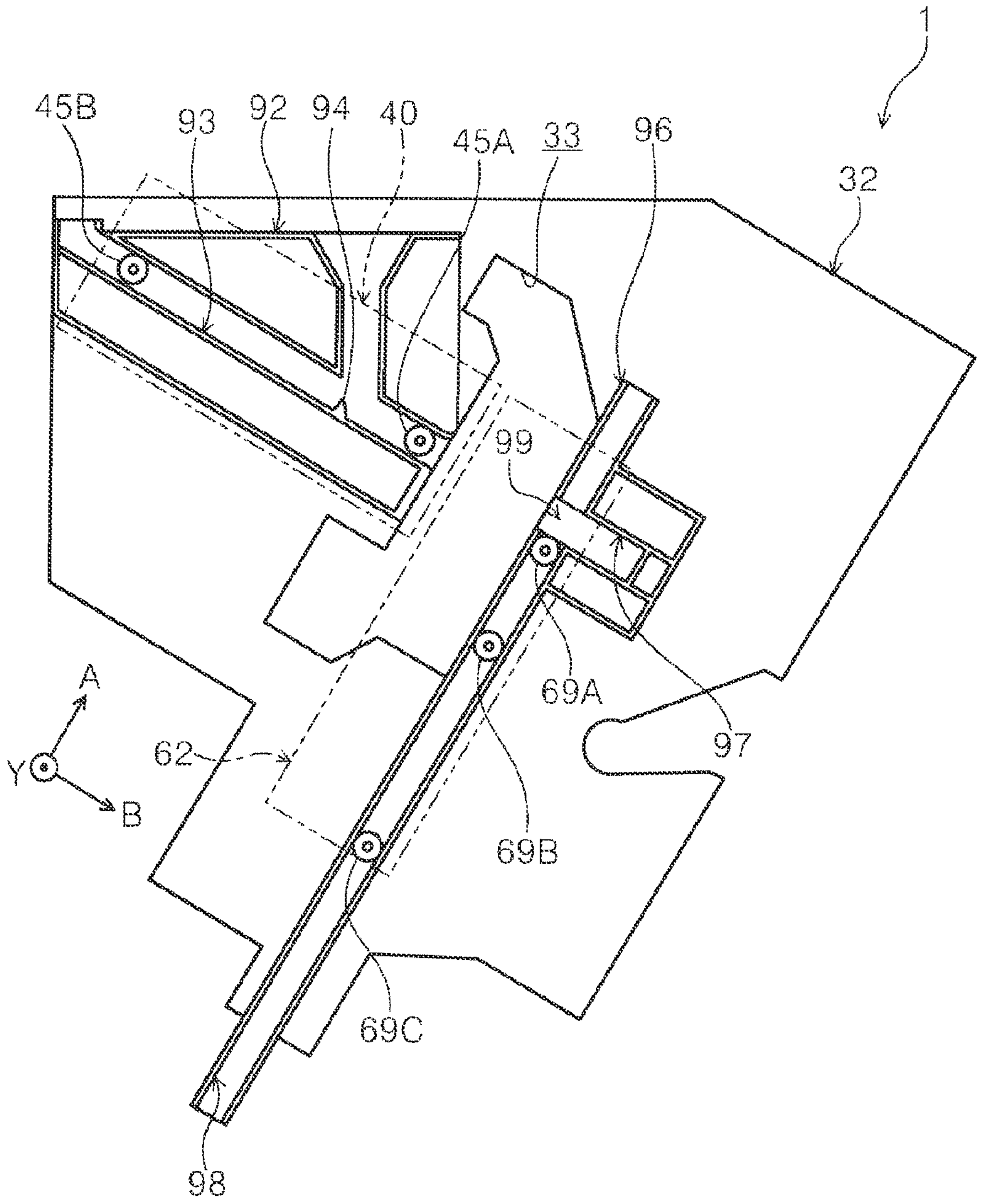
FIG. 13 is a diagram illustrating the positions of the rollers of the line head and the rollers of the cap unit when the line head according to the embodiment is in the second position.

As illustrated in FIG. 13, when the line head 40 is in the second position and the flushing portion 66 (refer to FIG. 11) is facing the nozzles N (refer to FIG. 11), the roller 45A is located in the +B direction end portion of the guide rail 93. The roller 45B is located on the −B direction side of the B direction center of the guide rail 93. In addition, the rollers 69A, 69B, and 69C are located on the −A direction side of the intersection portion 99 of the guide rail 98.

Figure 15:
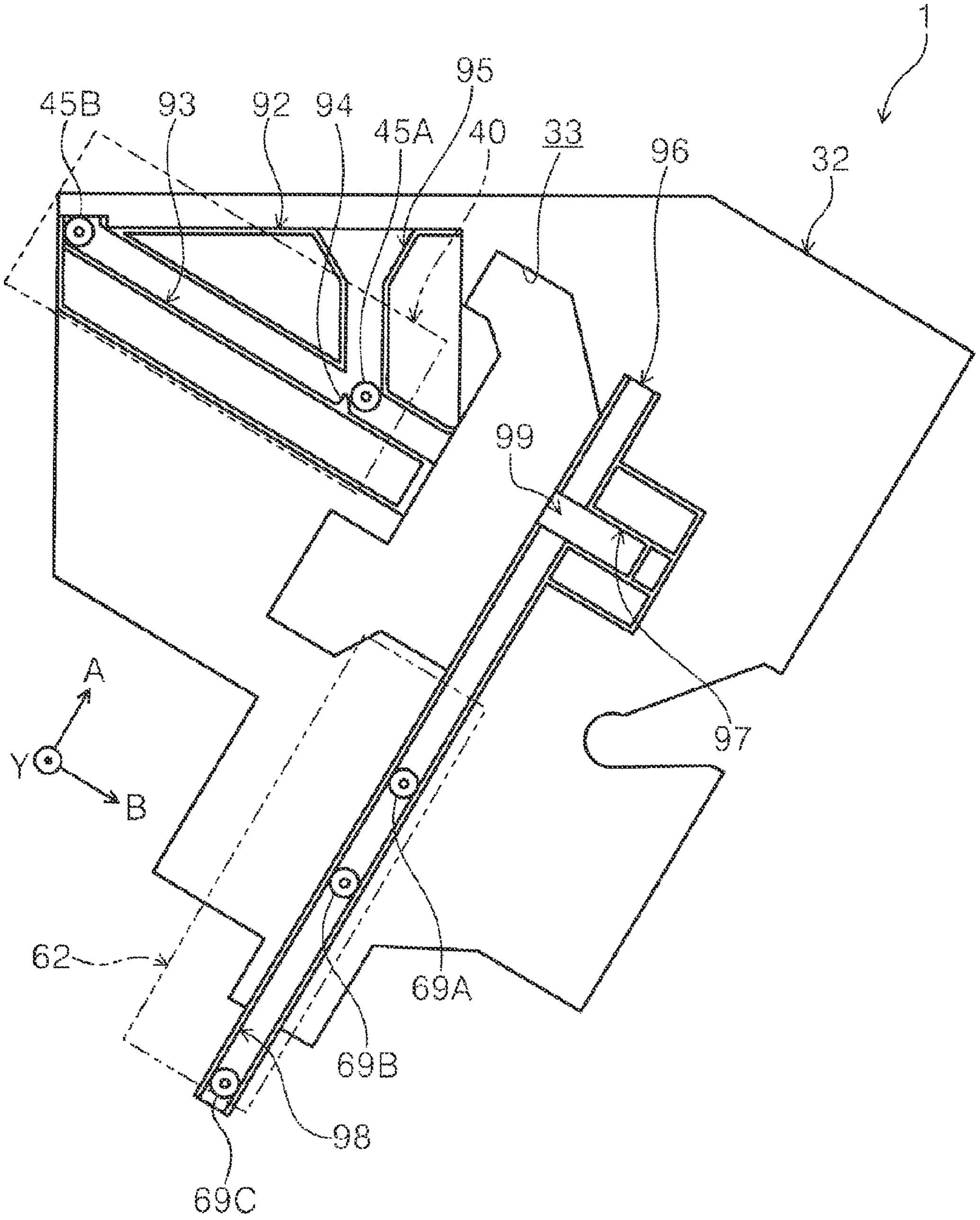
FIG. 15 is a schematic view illustrating a state in which the line head and the cap unit according to the embodiment are in retracted positions.

As illustrated in FIG. 15, when the line head 40 is in the replacement position and the cap unit 62 is in the retracted position, the roller 45A is in a position where it comes into contact with the restricting portion 94 of the guide rail 93. The roller 45B is located at the −B direction end portion of the guide rail 93. The rollers 69A and 69B are located on the −A direction side of the intersection portion 99 of the guide rail 98. The roller 69C is located at the −A direction end portion of the guide rail 98.

Further, the description of positions of the rollers 45C, 45D, 69D, 69E, and 69F on the guide member 102 is omitted.

As described above, the head moving unit 50 moves the line head 40 so that the movement direction of the line head 40 intersects both the vertical direction and the horizontal direction.

In addition, the head moving unit 50 (refer to FIG. 5) is provided so as to be capable of moving the line head 40 to any one of the recording position, the retracted position, the first position, the second position, the third position, the standby position, and the replacement position. In addition, the head moving unit 50 is configured to position the line head 40 in the standby position before positioning the line head 40 in any one of the first position, the second position, and the third position.

Figure 8:
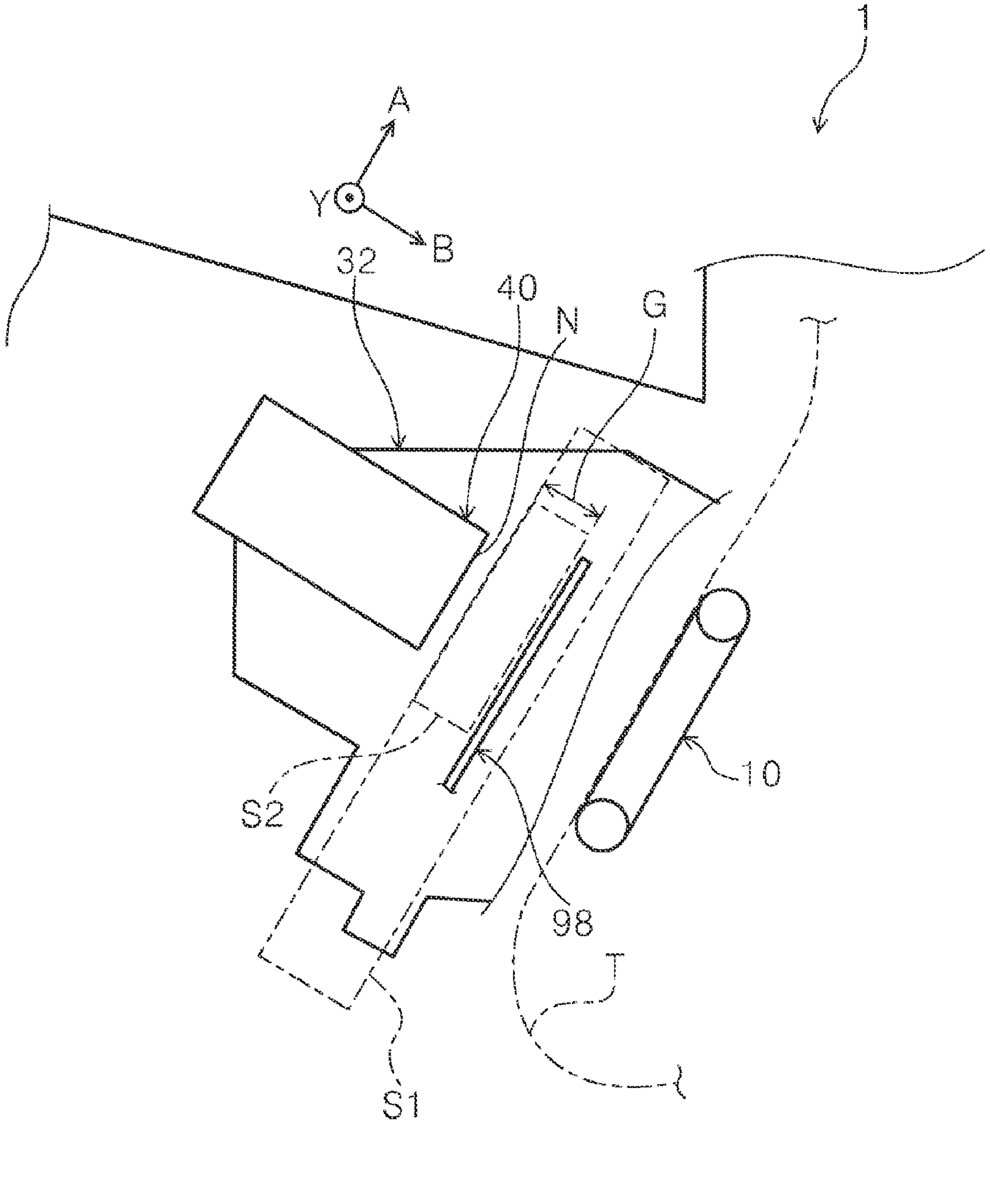
FIG. 8 is a schematic view illustrating movement areas of the cap unit and the wiper unit in the printer according to the embodiment.

As illustrated in FIG. 8, the area where the cap unit 62 (refer to FIG. 2) moves is defined as the first movement area S1. In addition, the area where the wiper unit 74 (refer to FIG. 6) moves is referred to as the second movement area S2. Further, in FIG. 8, the first movement area S1 and the second movement area S2 are simplified and represented by rectangular areas.

In the present embodiment, for example, a portion of the first movement area S1 and the second movement area S2 are disposed at the same position in the B direction. In other words, when viewed from the Y direction, a portion of the first movement area S1 and the second movement area S2 overlap in a range G in the B direction.

The second movement area S2 penetrates the side frame 32 in the Y direction.

The guide rail 98 is disposed so as to be offset in the B direction with respect to the second movement area S2. Specifically, the guide rail 98 is disposed so as to be offset in the +B direction with respect to the second movement area S2. Further, in the present embodiment, for example, the guide rail 98 is disposed adjacent to the second movement area S2.

As illustrated in FIG. 8, according to the printer 1, at least a portion of the first movement area S1 in which the cap unit 62 (refer to FIG. 2) moves and at least a portion of the second movement area S2 in which the wiper unit 74 moves are disposed at the same position in the B direction. As a result, compared with the configuration in which the first movement area S1 and the second movement area S2 are disposed so as to be offset in the B direction, since the area required for moving the cap unit 62 and the wiper unit 74 is reduced, it is possible to suppress the printer 1 from increasing in size in the movement direction of the line head 40.

According to the printer 1, the line head 40 moves in the B direction between the side frame 32 and the side frame 34 (refer to FIG. 4). Here, since the second movement area S2 penetrates the side frame 32 in the Y direction, the wiper unit 74 can be retracted to the outside with respect to the side frame 32, thus it is possible to suppress the movement area of the line head 40 from being narrowed by the wiper unit 74.

As illustrated in FIGS. 3 and 8, according to the printer 1, since the second movement area S2 is located at a position that divides the first guide member 92 and the second guide member 96, the first guide member 92 and the second guide member 96 that guide the line head 40 and the wiper unit 74 for cleaning the nozzles N can be disposed close to each other, thus the line head 40 can be reduced in size.

As illustrated in FIGS. 3 and 4, according to the printer 1, since the guide rails 93, 97, and 104 surround the rollers 45A, 45B, 45C, and 45D except at opening portions, when the head moving unit 50 (refer to FIG. 5) moves the line head 40 in the B direction, it is possible to suppress the position of the line head 40 from shifting in the A direction or the Y direction.

Figure 16:
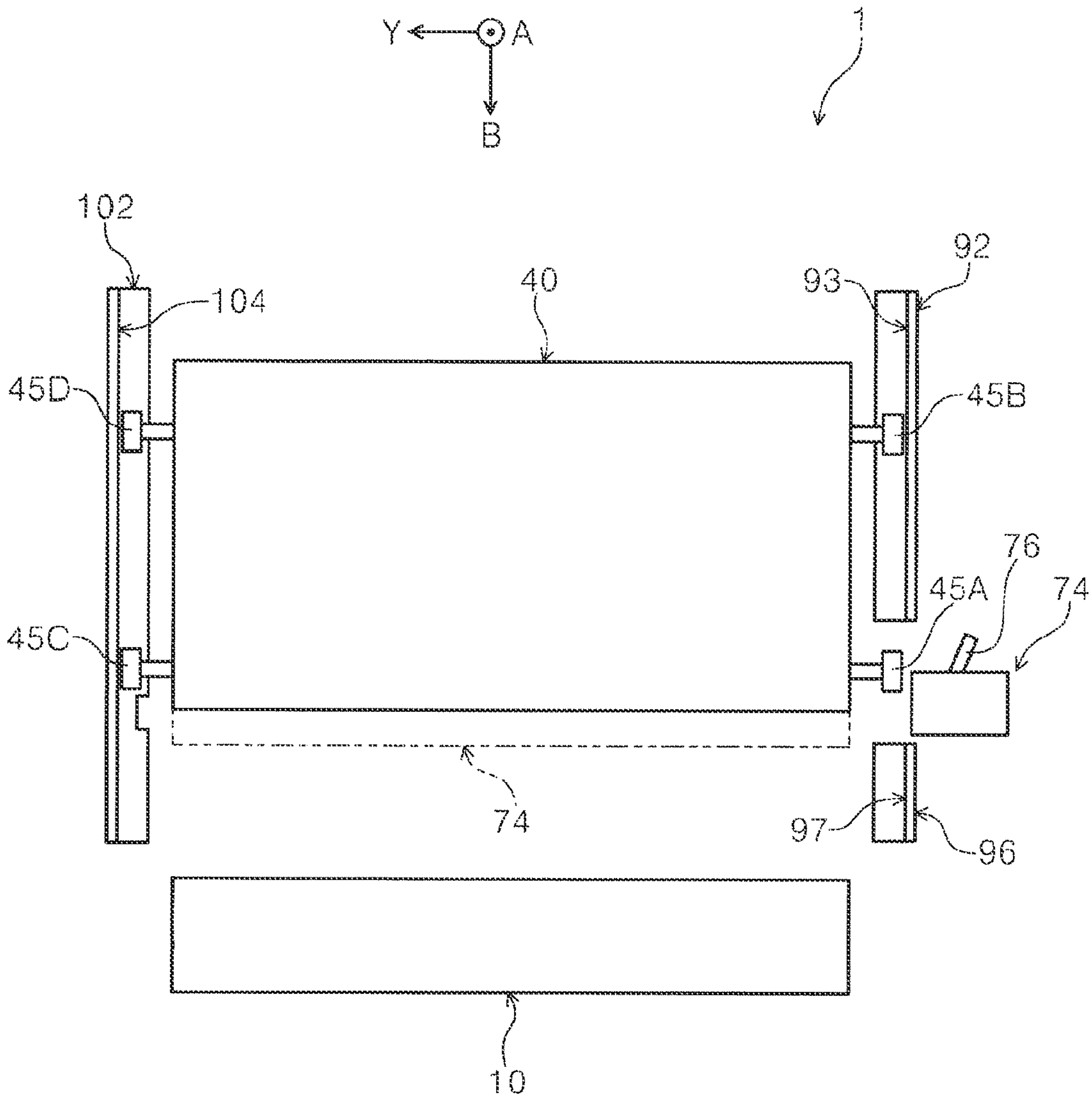
FIG. 16 is a schematic view illustrating a state in which the line head according to the embodiment is guided by longitudinal guide rails.

As illustrated in FIG. 16, according to the printer 1, when the roller 45A is located in the space of the second movement area S2 (refer to FIG. 8), that is, between the guide rail 93 and the guide rail 97, the roller 45B is guided by the guide rail 93, and the rollers 45C and 45D are guided by the guide rail 104. As a result, because the state in which the line head 40 is supported is maintained regardless of the position of the second movement area S2, it is possible to suppress the orientation of the line head 40 from changing during movement.

As illustrated in FIG. 3, according to the printer 1, when the line head 40 moves in the −B direction, the roller 45B is located at the widened portion K. As a result, since all of the rollers 45A, 45B, 45C, and 45D (refer to FIG. 4) are suppressed from being simultaneously located in the narrowest portion of the guide rails 93, 97, and 104, and the load acting on the guide rails 93, 97, and 104 from the rollers 45A, 45B, 45C, and 45D is reduced, it is possible to suppress a portion of the guide rails 93, 97, and 104 from being scraped off by the movement of the rollers 45A, 45B, 45C, and 45D.

As illustrated in FIGS. 3 and 4, according to the printer 1, since the guide rail 97 and the guide rail 98 intersect with each other, and the guide rail 104 and the guide rail 106 intersect with each other, the line head 40 and the cap unit 62 can be disposed close to each other, thus the printer 1 can be reduced in size.

As illustrated in FIG. 4, according to the printer 1, since the depth of the guide rail 104 is set larger than the depth of the guide rail 106, the guide rail 104 is continuously disposed in the B direction at the intersection portion 107, thus the roller 45C can be suppressed from coming off from the guide rail 104.

Figure 17:
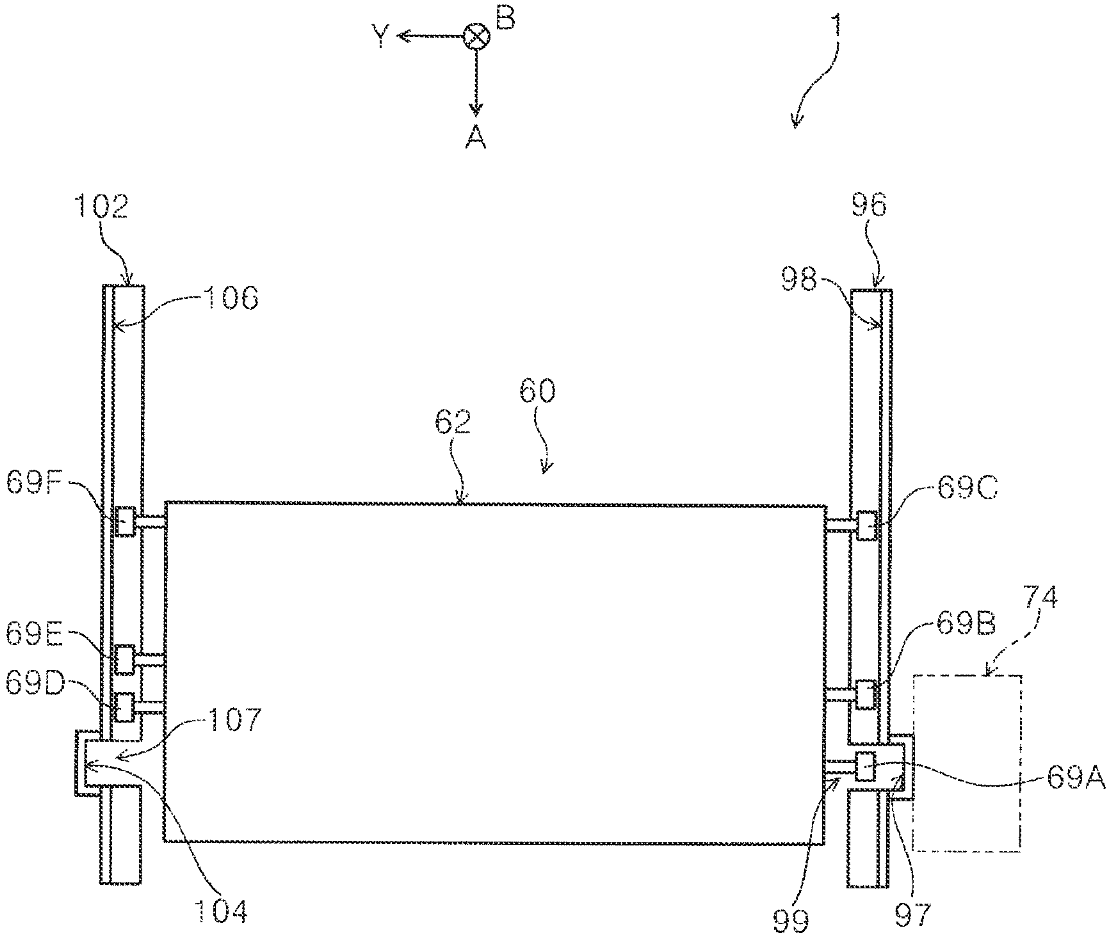
FIG. 17 is a schematic view illustrating a state in which the cap unit according to the embodiment is guided by lateral guide rails.

As illustrated in FIG. 17, according to the printer 1, when the roller 69A is located in the space of the intersection portion 99, the rollers 69B and 69C are guided by the guide rail 98, and the rollers 69D, 69E, and 69F are guided by the guide rail 106. As a result, regardless of the positions of the intersection portions 99 and 107, because the cap unit 62 is maintained in a supported state, it is possible to suppress a change in the orientation of the cap unit 62 during movement.

As illustrated in FIG. 8, according to the printer 1, because the guide rail 98 is disposed adjacent to the second movement area S2 in the B direction, the cap unit 62 (refer to FIG. 2) can be disposed close to the line head 40, thus the printer 1 can be reduced in size in the B direction.

As illustrated in FIG. 1, according to the printer 1, the head moving unit 50 (refer to FIG. 5) moves the line head 40 in the B direction, which intersects both the vertical direction and the horizontal direction. Gravity acting in the vertical direction on the line head 40 is decomposed into a component force along the +B direction and a component force along the −A direction. Here, because the component force acting on the line head 40 in the B direction becomes smaller than gravity acting on the line head 40 in the vertical direction, the force required to move the line head 40 is reduced, thus compared with a configuration in which the line head 40 is moved in the vertical direction, it is possible to suppress an increase in the load acting on the head moving unit 50.

The printer 1 according to the embodiment of the present disclosure is basically based on having the above-described configurations; however, it is of course possible to partially change or omit a configuration without departing from the scope of the present disclosure.

The second movement area S2 does not have to penetrate the side frame 32. That is, the wiper unit 74 may be located in the +Y direction with respect to the side frame 32.

The first guide member 92 does not have to be divided by the second movement area S2.

Each guide rail is not limited to one formed in a groove shape. For example, it may be formed of only one side wall.

The protruding portion is not limited to such a rotary member, and may be configured as a sliding portion that does not rotate.

The widened portion K need not be formed on the guide rail 93.

When the cap unit 62 is configured to move while being supported, the guide rails 98 and 106 may be omitted.

The depth of the guide rail 104 and the depth of the guide rail 106 may be the same, and the guide rail 104 may be divided by the intersection portion 107.

When the roller 69A is located at the intersection portion 99, the roller 69D may be located at the intersection portion 107.

The guide rail 98 may be disposed apart from the second movement area S2 in the B direction.

The head moving unit 50 may move the line head 40 in the vertical direction or the horizontal direction.

All of the first movement area S1 and all of the second movement area S2 may be disposed at the same position in the B direction.

The rollers 45A and 45C, and the rollers 45B and 45D may be disposed so as to be offset in the B direction.

The rollers 69A and 69D, the rollers 69B and 69E, and the rollers 69C and 69F may be disposed at the same positions in the A direction, respectively.

What is claimed is:

1. A recording apparatus, comprising:

a support portion having a support surface that configures a transport route and transports a medium supported by the support surface in a transport direction which is an inclined direction between a horizontal direction and a vertical direction;

a recording head having an ejecting surface that faces in the support portion and is provided with a nozzle configured to eject liquid to the medium to be transported in the transport direction;

a cap portion configured to cover the ejecting surface;

a movement mechanism configured to move the recording head in a moving direction which is orthogonal to the transport direction; and a cap moving portion configured to support the cap portion and move the cap portion between a cap position where a cap surface of the cap portion covers the ejecting surface and a standby position where the cap surface does not cover the ejecting surface, wherein the cap moving portion moves the cap portion in the transport direction with the cap surface faces the ejecting surface, the standby position is apart from the cap position in the transport direction, and when the cap portion is viewed from a direction which is orthogonal to the transport direction, a dimension of the cap surface in a width direction which is orthogonal to the transport direction is larger than a dimension of the cap surface in the transport direction.

2. The recording apparatus according to claim 1, wherein the cap portion is coupled to a waste liquid reservoir configured to store waste liquid, the standby position is below the cap position, and the waste liquid reservoir is below the cap portion.

3. The recording apparatus according to claim 2, wherein the movement mechanism moves, along the moving direction, the recording head to a recording position at which recording on the medium is performed, and a retreat position apart from the support portion with respect to the recording position, and the retreat position includes a position of the recording head when the cap portion covers the ejecting surface.

4. The recording apparatus according to claim 3, wherein the cap portion completes movement when the recording head stands by at the retreat position.

5. The recording apparatus according to claim 4, further comprising a cleaning portion, wherein the retreat position includes a first position at which the cap portion is configured to cover the ejecting surface and a second position at which the cleaning portion is configured to clean the ejecting surface, and the first position is, in the moving direction, closer to the support portion than the second position.

6. The recording apparatus according to claim 3, further comprising:

an eccentric cam configured to come into contact with the recording head at the recording position; and a motor configured to rotate the eccentric cam according to the recording position.

7. The recording apparatus according to claim 3, further comprising an eccentric cam that does not come into contact with the recording head at the retreat position.

8. The recording apparatus according to claim 1, further comprising:

a medium accommodating portion;

a pick roller configured to send out the medium accommodated in the medium accommodating portion from the medium accommodating portion in a first direction which is the horizontal direction;

a discharge portion; and a discharge roller configured to discharge the medium in a second direction opposite to the first direction toward the discharge portion on which the medium on which the liquid was ejected is stacked.

9. The recording apparatus according to claim 8, further comprising:

a manual feed tray provided on a side of the first direction with respect to the transport route in which the medium sent out by the pick roller is transported toward the discharge portion via the support portion; and a transport path joining the transport route from the side of the first direction, and configured to transport the medium set in the manual feed tray to the transport route.

10. The recording apparatus according to claim 1, wherein the movement mechanism moves, along the moving direction, the recording head to a recording position at which recording on the medium is performed, and a retreat position apart from the support portion with respect to the recording position, and the retreat position includes a position of the recording head when the cap portion covers the ejecting surface.

11. The recording apparatus according to claim 10, further comprising:

a cleaning portion configured to clean the ejecting surface, wherein the retreat position includes the position of the recording head when the cap portion covers the ejecting surface and a position of the recording head when the cleaning portion cleans the ejecting surface.

12. The recording apparatus according to claim 11, wherein the retreat position includes a first position at which the cap portion is configured to cover the ejecting surface and a second position at which the cleaning portion is configured to clean the ejecting surface, and the first position is, in the moving direction, closer to the support portion than the second position.

13. The recording apparatus according to claim 10, wherein the cap portion completes movement when the recording head stands by at the retreat position.

14. The recording apparatus according to claim 11, wherein the cleaning portion completes movement when the recording head stands by at the retreat position.

15. The recording apparatus according to claim 10, further comprising:

an eccentric cam configured to come into contact with the recording head at the recording position; and a motor configured to rotate the eccentric cam according to the recording position.

16. The recording apparatus according to claim 10, further comprising an eccentric cam that does not come into contact with the recording head at the retreat position.

17. The recording apparatus according to claim 1, further comprising a cleaning portion configured to move back and forth in the width direction that intersects both a movement direction and a first direction between the recording head and the support portion, wherein the cleaning portion cleans the ejecting surface when the recording head is located at a retracted position, the movement mechanism moves, along the moving direction, the recording head to a recording position at which recording on the medium is performed, and a retreat position apart from the support portion with respect to the recording position, and at least a portion of a first movement area where the cap portion moves and at least a portion of a second movement area where the cleaning portion moves are disposed at an identical position in the movement direction.

18. The recording apparatus according to claim 17, further comprising a set of side walls that face each other in a second direction, wherein the recording head moves in the movement direction between one of the side walls and another of the side walls, and the second movement area penetrates the one of the side walls in the width direction.

19. The recording apparatus according to claim 18, wherein the set of the side walls are respectively provided with guide members that guide the recording head in the movement direction, and one of the guide members is divided in the movement direction by the second movement area.

20. The recording apparatus according to claim 19, wherein the recording head is provided with protruding portions that protrude in the second direction, and the guide members have longitudinal groove portions that are open toward the recording head and that guide the protruding portions in the movement direction.

* * * * *